US011686388B2

(12) United States Patent
Zhu et al.

(10) Patent No.: US 11,686,388 B2
(45) Date of Patent: *Jun. 27, 2023

(54) CLOSED-LOOP CONTROL OF AN INFINITELY VARIABLE TRANSMISSION

(71) Applicant: UNIVERSITY OF MARYLAND, BALTIMORE COUNTY, Baltimore, MD (US)

(72) Inventors: Weidong Zhu, Ellicott City, MD (US); Xuefeng Wang, Scott Depot, WV (US); Gang Li, Halethorpe, MD (US)

(73) Assignee: University of Maryland, Baltimore County, Baltimore, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/684,507

(22) Filed: Mar. 2, 2022

(65) Prior Publication Data

US 2022/0186830 A1 Jun. 16, 2022

Related U.S. Application Data

(62) Division of application No. 17/232,225, filed on Apr. 16, 2021, now Pat. No. 11,268,615.

(Continued)

(51) Int. Cl.
*F16H 59/70* (2006.01)
*F16H 61/664* (2006.01)
(Continued)

(52) U.S. Cl.
CPC .......... *F16H 61/664* (2013.01); *F16H 3/76* (2013.01); *F16H 59/40* (2013.01); *F16H 59/42* (2013.01);
(Continued)

(58) Field of Classification Search
CPC .......... F16H 59/44; F16H 61/66; F16H 29/04; F16H 61/664; F16H 59/42; F16H 59/40;
(Continued)

(56) References Cited

U.S. PATENT DOCUMENTS 1,892,504 A 12/1932 Davis
4,112,778 A * 9/1978 Korosue ................. F16H 29/04
74/570.21

(Continued)

FOREIGN PATENT DOCUMENTS

CN 109764099 5/2019
JP 4042946 B2 * 2/2008 ............. F02N 11/08
(Continued)

OTHER PUBLICATIONS

Wang, X. F., and Zhu, W. D., 2018, "Design and Stability Analysis of an Integral Time-Delay Feedback Control Combined With an Open-Loop Control for an Infinitely Variable Transmission System," ASME Journal of Dynamic Systems, Measurement, and Control, 140(1), p. 011007.

(Continued)

*Primary Examiner* — Justin Holmes
(74) *Attorney, Agent, or Firm* — Tristan A. Fuierer; Casimir Jones, SC

(57) ABSTRACT

A nonlinear closed-loop control combined with an integral time-delay feedback control is disclosed to adjust a speed ratio of an infinitely variable transmission (IVT) system. A speed ratio control for an IVT system involves a forward speed controller and a crank length controller for different speed ranges. The time-delay control is designed to reduce speed fluctuations of the output speed of an IVT with an accurate speed ratio. The speed ratio of an IVT with the disclosed control strategy can achieve an excellent tracking response for the desired constant output speed and reduce (Continued)

speed fluctuations of the output speed of an IVT by the time-delay feedback control.

18 Claims, 11 Drawing Sheets

Related U.S. Application Data

(60) Provisional application No. 63/010,928, filed on Apr. 16, 2020.

(51) Int. Cl.
  *F16H 59/40*   (2006.01)
  *F16H 59/42*   (2006.01)
  *F16H 3/76*    (2006.01)
  *F16H 61/00*   (2006.01)
  *F16H 59/44*   (2006.01)

(52) U.S. Cl.
  CPC ............. *F16H 59/70* (2013.01); *F16H 59/44* (2013.01); *F16H 2059/704* (2013.01); *F16H 2061/009* (2013.01); *F16H 2061/0096* (2013.01)

(58) Field of Classification Search
  CPC ...... F16H 59/70; F16H 3/76; F16H 2061/009; F16H 2059/704; F16H 2061/0096
  See application file for complete search history.

(56) References Cited

U.S. PATENT DOCUMENTS

| | | | |
|---|---|---|---|
| 5,392,664 | A | 2/1995 | Gogins |
| 9,222,558 | B2 * | 12/2015 | Zhu ........................ F16H 29/20 |
| 11,268,615 | B2 * | 3/2022 | Zhu ........................ F16H 59/42 |

FOREIGN PATENT DOCUMENTS

| | | | |
|---|---|---|---|
| JP | 2015001266 | | 1/2015 |
| KR | 20180074057 | | 7/2018 |
| KR | 20180074057 | A * | 7/2018 |

OTHER PUBLICATIONS

Wang, X. F., and Zhu, W. D., 2016, "Design, Modeling, and Experimental Validation of a Novel Infinitely Variable Transmission Based on Scotch Yoke Systems," ASME Journal of Mechanical Design, 138(1), p. 015001.
Ross, M., 1997, "Fuel Efficiency and the Physics of Automobiles," Contemporary Physics, 38(6), pp. 381-394, Abstract Only.
Manwell, J. F., McGowan, J. G., and Rogers, A. L., 2010, Wind Energy Explained: Theory, Design and Application, John Wiley & Sons.
Rupp, D., and Guzzella, L., 2010, "Adaptive Internal Model Control With Application to Fueling Control," Control Engineering Practice, 18(8), pp. 873-881, Abstract Only.
Sun, Z. X., and Hebbale, K., 2005, "Challenges and Opportunities in Automotive Transmission Control," Proceedings of the 2005 American Control Conference, Portland, pp. 3284-3289.
Kulkarni, M., Shim, T., and Zhang, Y., 2007, "Shift Dynamics and Control of Dual-Clutch Transmissions," Mechanism and Machine Theory, 42(2), pp. 168-182.
Srivastava, N., and Haque, I., 2009, "A Review on Belt and Chain Continuously Variable Transmissions (CVT): Dynamics and Control," Mechanism and Machine Theory, 44(1), pp. 19-41.
Pfiffner, R., Guzzella, L., and Onder, C., 2003, "Fuel-Optimal Control of CVT Powertrains," Control Engineering Practice, 11 (3), pp. 329-336.
Saito, T., and Miyamoto, K., 2010, "Prediction of CVT Transmission Efficiency by Metal V-Belt and Pulley Behavior With Feedback Control," SAE International, https://doi.org/10.4271/2010-01-0855, Abstract Only.
Zhu, C., Liu, H., Tian, J., Xiao, Q., and Du, X., 2010, "Experimental Investigation on the Efficiency of the Pulley-Drive CVT," International Journal of Automotive Technology, 11 (2), pp. 257-261.
Savaresi, S. M., Taroni, F. L., Previdi, F., and Bittanti, S., 2004, "Control System Design on a Power-Split CVT for High-Power Agricultural Tractors," IEEE/ASME Transactions on Mechatronics, 9(3), pp. 569-579.
Van Berkel, K., Hofman, T., Vroemen, B., and Steinbuch, M., 2012, "Optimal Control of a Mechanical Hybrid Powertrain," IEEE Transactions on Vehicular Technology, 61 (2), pp. 485-497.
Pesgens, M., Vroemen, B., Stouten, B., Veldpaus, F., and Steinbuch, M., 2006, "Control of a Hydraulically Actuated Continuously Variable Transmission," Vehicle System Dynamics, 44(5), pp. 387-406.
Setlur, P., Wagner, J. R., Dawson, D. M., and Samuels, B., 2003, "Nonlinear Control of a Continuously Variable Transmission (CVT)," IEEE Transactions on Control Systems Technology, 11 (1), pp. 101-108.
Ryu, W., and Kim, H., 2008, "CVT Ratio Control With Consideration of CVT System Loss," International Journal of Automotive Technology, 9(4), pp. 459-465.
Glitzenstein, K., and Hedrick, J. K., 1990, "Adaptive Control of Automotive Transmissions," Proceedings of the 1990 American Control Conference, San Diego, pp. 1849-1855; Abstract Only.
Yildiz, Y., Annaswamy, A. M., Yanakiev, D., and Kolmanovsky, I., 2011, "Spark-Ignition-Engine Idle Speed Control: An Adaptive Control Approach," IEEE Transactions on Control Systems Technology, 19(5), pp. 990-1002.
Shi, G., Dong, P Sun, H. Q Liu, Y Cheng, Y. J., and Xu, X. Y 2017, "Adaptive Control of the Shifting Process in Automatic Transmissions," International Journal of Automotive Technology, 18(1), pp. 179-194.
Elzaghir, W., Zhang, Y., Natarajan, N., Massey, F., and Mi, C. C., 2018, "Model Reference Adaptive Control for Hybrid Electric Vehicle With Dual Clutch Transmission Configurations," IEEE Transactions on Vehicular Technology, 67(2), pp. 991-999.
Liu, F., Li, Y. X., Zhang, J. W., Huang, H. C., and Zhao, H. P., 2002, "Robust Control for Automated Clutch of AMT Vehicle," SAE Technical Paper, 2002-01-0933; Abstract Only.
Oomen, T., van der Meulen, S., Bosgra, O., Steinbuch, M., and Elfring, J., 2010, "A Robust-Control-Relevant Model Validation Approach for Continuously Variable Transmission Control," Proceedings of the 2010 American Control Conference, Baltimore, pp. 3518-3523.
Oomen, T., and van der Meulen, S., 2013, "High Performance Continuously Variable Transmission Control Through Robust Control-Relevant Model Validation," ASME Journal of Dynamic Systems, Measurement, and Control, 135(6), p. 061018.
Yue, D., Tian, E., and Han, Q. L., 2013, "A Delay System Method for Designing Event Triggered Controllers of Networked Control Systems," IEEE Transactions on Automatic Control, 58(2), pp. 475-481.
Zhang, X. M., Han, Q. L., and Han, D. S., 2009 "Effects of Small Time-Delays on Dynamic Output Feedback Control of Offshore Steel Jacket Structures Subject to Wave-induced Forces," Proceedings of the IEEE Conference on Decision and Control, DOI: 10.1109/CDC.2009.5399982.
Isermann, R., and Münchhof, M., 2011, Identification of Dynamic Systems: An Introduction with Applications, vol. 1, Springer, Berlin Heidelberg.
G. Li, W. Zhu, Design and power loss evaluation of a noncircular gear pair for an infinitely variable transmission, Mechanism and Machine Theory, 156, 2021, 104137.
S. J. Sangiuliano, Turning of the tides: Assessing the international implementation of tidal current turbines, Renewable and Sustainable Energy Reviews 80 (2017) 971-989.
E. Denny, The economics of tidal energy, Energy Policy 37 (5) (2009) 1914-1924.
R. Everett, G. Boyle, S. Peake, J. Ramage, Energy Systems and Sustain-ability: Power for a Sustainable Future, Oxford University Press, 2012; Book—Copy Not Provided.

(56) References Cited

OTHER PUBLICATIONS

F. O. Rourke, F. Boyle, A. Reynolds, Tidal energy update 2009, Applied Energy 87 (2) (2010) 398-409.
M. Chowdhury, K. S. Rahman, V. Selvanathan, N. Nuthammachot, M. Suklueng, A. Mostafaeipour, A. Habib, M. Akhtaruzzaman, N. Amin, K. Techato, Current trends and prospects of tidal energy technology, Environment, Development and Sustainability (2021) 23: 8179-8194.
P. L. Fraenkel, Power from marine currents, Proceedings of the Institution of Mechanical Engineers, Part A: Journal of Power and Energy 216 (2002) A01801.
N. D. Laws, B. P. Epps, Hydrokinetic energy conversion: Technology, re-search, and outlook, Renewable and Sustainable Energy Reviews 57 (2016) 1245-1259.
K. A. Haas, H. M. Fritz, S. P. French, B. T. Smith, V. Neary, Assessment of energy production potential from tidal streams in the united states, Tech. rep., Georgia Tech Research Corporation (2011).
M. Lewis, S. Neill, P. Robins, M. Hashemi, Resource assessment for future generations of tidal stream energy arrays, Energy 83 (2015) 403-415.
S. W. Funke, S. C. Kramer, M. D. Piggott, Design optimisation and resource assessment for tidal stream renewable energy farms using a new continuous turbine approach, Renewable Energy 99 (2016) 1046-1061.
C. Frid, E. Andonegi, J. Depestele, A. Judd, D. Rihan, S. I. Rogers, E. Kenchington, The environmental interactions of tidal and wave energy generation devices, Environmental Impact Assessment Review 32 (1) (2012) 133-139.
A. M. Plagge, L. Jestings, B. P. Epps, Next-generation hydrokinetic power take-off via a novel variable-stroke hydraulic system, in: Proceedings of International Conference on Offshore Mechanics and Arctic Engineering, vol. 45547, American Society of Mechanical Engineers, 2014, p. V09BT09A018.
A. C. Mahato, S. K. Ghoshal, Various power transmission strategies in wind turbine: An overview, International Journal of Dynamics and Control 7 (3) (2019) 1149-1156; Abstract Only.
K. Touimi, M. Benbouzid, P. Tavner, Tidal stream turbines: With or with-out a gearbox?, Ocean Engineering 170 (2018) 74-88; Abstract Only.
G. Payne, A. Kiprakis, M. Ehsan, W. H. S. Rampen, J. Chick, A. Wallace, Efficiency and dynamic performance of digital displacementTM hydraulic transmission in tidal current energy converters, Proceedings of the Institution of Mechanical Engineers, Part A: Journal of Power and Energy 221 (2) (2007) 207-218.
H.W. Liu, W. Li, Y.G. Lin, S. Ma, Tidal current turbine based on hydraulic transmission system, Journal of Zhejiang University—Science A 12 (7) (2011) 511-518.
V. Khare, C. Khare, S. Nema, P. Baredar, Tidal Energy Systems: Design, Optimization and Control, Elsevier, 2018. Book—Cover Provided Only.
R. Kempener, F. Neumann, Tidal energy technology brief, International Renewable Energy Agency (IRENA) (2014) 1-34.
A. Giallanza, M. Porretto, L. Cannizzaro, G. Marannano, Analysis of the maximization of wind turbine energy yield using a continuously variable transmission system, Renewable Energy 102 (2017) 481-486.
X.X. Yin, Y.-g. Lin, W. Li, H.-W. Liu, Y.-j. Gu, Output power control for hydro-viscous transmission based continuously variable speed wind turbine, Renewable Energy 72 (2014) 395-405.
H. Liu, Y. Lin, M. Shi, W. Li, H. Gu, Q. Xu, L. Tu, A novel hydraulic-mechanical hybrid transmission in tidal current turbines, Renewable Energy 81 (2015) 31-42.
S. Shamshirband, D. Petković, A. Amini, N. B. Anuar, V.Nikolić, Ž.Ćo-jbašić, M. L. M. Kiah, A. Gani, Support vector regression methodology for wind turbine reaction torque prediction with powersplit hydrostatic continuous variable transmission, Energy 67 (2014) 623-630; Abstract Only.
P. Qian, B. Feng, H. Liu, X. Tian, Y. Si, D. Zhang, Review on configuration and control methods of tidal current turbines, Renewable and Sustainable Energy Reviews 108 (2019) 125-139.
Y. Xiong, C. R. Berger, Chesapeake bay tidal characteristics, Journal of Water Resource and Protection 2 (7) (2010) 619.
K. L. Earwaker, C. E. Zervas, Assessment of the National Ocean Service's Tidal Current Program, National Oceanic and Atmospheric Administration, 1999. Can Not Locate Reference.
K. Liu, M. Yu, W. Zhu, Enhancing wind energy harvesting performance of vertical axis wind turbines with a new hybrid design: A fluidstructure interaction study, Renewable Energy 140 (2019) 912-927.

\* cited by examiner

CLOSED-LOOP CONTROL OF AN INFINITELY VARIABLE TRANSMISSION

CROSS-REFERENCE TO RELATED APPLICATIONS

This application is a divisional application claiming priority to U.S. patent application Ser. No. 17/232,225, filed on Apr. 16, 2021, which claims priority to U.S. Provisional Patent Application No. 63/010,928 filed on Apr. 16, 2020 in the name of Weidong Z H U et al. and entitled "Novel Infinitely Variable Transmission for Tidal Current Energy Harvesting," both of which are incorporated by reference herein in their entirety.

FIELD

The present invention relates to an infinitely variable transmission.

BACKGROUND OF THE INVENTION

To improve dynamic performance and fuel efficiency of powertrain systems, some types of automatic transmissions, i.e., infinitely variable transmissions (IVTs), automatic manual transmissions (AMTs), continuously variable transmissions (CVTs), dual clutch transmissions (DCTs), and electrically variable transmissions (EVTs), are used in wind turbine and automotive applications [1, 2, 3, 4]. A basic function of automatic transmissions is to smoothly and efficiently convert the torque from a prime mover, such as an engine, to an application part with a continuous output-to-input speed ratio. Among many different technical issues for developing these automatic transmissions, design of their control systems are crucial to achieve continuous output-to-input speed ratios and superior fuel efficiency [5]. Since AMTs, DCTs, and EVTs use clutch-to-clutch shifts to adjust output-to-input speed ratios, the torque interruption occurs during shifts [6, 7]. Control systems of these clutch-to-clutch shift transmissions are developed by using a combination of a gain-scheduled feedback control and an open-loop control. CVTs enable the continuously variation of their speed ratios and torque conversion from a prime mover to an application part in a wide range to maximize the fuel efficiency [8]. Since CVTs convert torques based on friction between pulleys and a belt or a chain, power loss of CVTs is large at the start-up stage that sliding between pulleys and the belt or the chain occurs with a large torque and a large speed ratio, and the minimum speed ratio of a CVT cannot be zero. Since sliding exists in CVTs, the gain-scheduled feedback control and the open-loop control is unstable for CVTs [6, 9]. Hence, a speed ratio control is needed for CVTs to maintain a specified speed ratio with optimal clamping forces between pulleys and the belt for avoiding sliding and maximizing fuel efficiency [10, 11]. Meanwhile, in order to improve the capability of the large torque conversion at the start-up stage, some power-split systems are used combined with traditional CVTs, such as a hydrostatic transmission [12] and a flywheel system [13]. Since the coordination of the power-split system and mechanic parts of the CVT cannot be only achieved by mechanical components, a sophisticated electronic control system is inherently needed to optimize power distribution between the CVT and the power-split system [14, 15].

Unlike belt-pulley or chain-pulley systems used in CVTs, an IVT uses all gear contact to achieve a continuously variable speed ratio, where the output-to-input speed ratio ranges from zero to a certain value. At the zero speed ratio, the engine shaft can be idling while the vehicle is static; the vehicle speed can be increased by continuously increasing the speed ratio. This property can eliminate the use of clutches, which can improve the drivability by eliminating sudden jerks, or increase the efficiency at low speeds by eliminating a hydrodynamic CVT-based torque converter. However, prior art IVTs have not adequately achieved a continuously varied speed ratio from zero without decreasing the transmission efficiency and reliability. Further, prior art IVTs do not adequately operate at high frequency without encountering difficulties in controlling the engagement of the gears. Additionally, problems of efficiency, durability, compactness, variability of the peak-to-peak instantaneous output speed variations, torque limitations, and vibrations continue be evident in prior attempts. Further, in cam-based IVTs, it is not possible to use noncircular gears since it results in phase changes.

An IVT using two scotch yoke systems and a noncircular gear pair was designed in [2] to generate a continuously variable output-to-input speed ratio. Since the IVT converts the torque by contact forces instead of the friction force, the minimum speed ratio of the IVT can be zero and the variable range of the speed ratio is larger than that of CVTs. The larger variable range of the speed ratio of the IVT allows the prime mover to virtually operate in the optimal speed region that is independent the speed of the application part to maximize fuel efficiency. Hence, the speed ratio of the IVT highly depends on the speed of the prime mover. The prime goal of a control system of the IVT is to operate the speed of the prime mover to an optimal value for high dynamic performance and fuel efficiency.

A gain-scheduled feedback control combined with an open-loop control is widely used in automatic transmission control [6, 8]. The open-loop control is usually developed based on look-up tables with calibrated variables. With increment the number of speed ratios for different driving conditions of automatic transmissions, the number of calibrated variables in look-up tables to guarantee smooth shifts for all driving conditions rises up quickly and the calibration time of the open-loop control is prolonged. To reduce the calibration time and improve the coordination of the open-loop control, some speed ratio maps [16] and adaptive algorithms [17, 18, 19, 20] are developed for the calibration process.

Since the torque that is generated by the prime mover is highly oscillating, desired shift performance that can represent transmission ratio changes of the automatic transmission are also highly oscillating. Model based controls have been developed to improve shift performance of automatic transmissions with the associated dynamic models. However, uncertain driving conditions and wide operation ranges of automatic transmissions affect the robustness of model-based controls. In order to maintain robustness of the control system within uncertain driving conditions, a nonlinear controller was designed based on a variable structure control for controlling clutch shifts in an AMT [21]. In addition to desired shift performance, a multi-variable closed-loop feedback control was developed in [22, 23] to improve fuel efficiency and reduce settling time of CVTs based on a robust control-relevant model validation method.

As more speed ratios are added to automatic transmissions, gain-scheduled feedback controls and model-based controls of automatic transmissions get more complicated. Effects of time-delays and destabilization are becoming more significant in various nonlinear dynamic control systems [24]. Time-delays usually reduce system shift performance and even lead to system instability [25]. Since traditional shift schedule of control systems of automatic transmissions only considers vehicle speed and throttle angle to determine speed ratios and shift points, time-delays with unknown nonlinear time-varying internal disturbance limits and have become a concern under uncertain driving conditions and irregularly shaped operating regions. A flexible shift schedule that is pleasing to the customers and favorable for fuel economy must be developed.

SUMMARY OF THE INVENTION

In one aspect, an infinitely variable transmission control system is described, said infinitely variable transmission control system comprising:
  a crank length controller comprising electronic components configured to:
    determine a desired output rotation speed of an infinitely variable transmission; and
    determine a control signal for a crank length control mechanism based on the determined output rotation speed; and
  a crank length control mechanism configured to receive the control signal and control the crank length of the infinitely variable transmission based on the control signal.

In another aspect, an infinitely variable transmission control system is described, said infinitely variable transmission control system comprising:
  an input-control module configured to control a motion conversion module of an infinitely variable transmission; and
  a forward speed controller comprising electronic components configured to:
    determine a crank length for the infinitely variable transmission, a desired modulated input speed of the input-control module, and an output torque of an output shaft of the infinitely variable transmission; and
    output a control signal to the input-control module based on the determined crank length, the desired modulated input speed, and the output torque.

In still another aspect, an infinitely variable transmission control system is described, said infinitely variable transmission control system comprising:
  a crank length controller comprising electronic components configured to:
    determine a desired output rotation speed of an infinitely variable transmission; and
    determine a control signal for a crank length control mechanism based on the determined output rotation speed;
  a crank length control mechanism configured to receive the control signal and control the crank length of the infinitely variable transmission based on the control signal;
  an input-control module configured to control a motion conversion module of the infinitely variable transmission; and
  a forward speed controller comprising electronic components configured to:
    receive the crank length;
    determine a desired modulated input speed of the input-control module and an output torque of an output shaft of the infinitely variable transmission; and
    output a control signal to the input-control module based on the determined crank length, the desired modulated input speed, and the output torque.

In still another aspect, a method for control of an infinitely variable transmission is described, the method comprising:
  determining a desired output rotation speed of the infinitely variable transmission; and
  determining a control signal for a crank length control mechanism based on the determined output rotation speed; and
  at a crank length control mechanism:
    receiving the control signal; and
    controlling the crank length of the infinitely variable transmission based on the control signal.

In yet another aspect, a method for control of an infinitely variable transmission is described, the method comprising:
  determining a crank length for the infinitely variable transmission, a desired modulated input speed of an input-control module, and an output torque of an output shaft of the infinitely variable transmission, wherein the input-control module is configured to control a motion conversion module of an infinitely variable transmission; and
  outputting a control signal to the input-control module based on the determined crank length, the desired modulated input speed, and the output torque.

In another aspect, a computer program product comprising a computer readable storage medium having program instructions embodied therewith, the program instructions executable by a computing device to cause the computing device to:
  determine a desired output rotation speed of an infinitely variable transmission; and
  determine a control signal for a crank length control mechanism based on the determined output rotation speed; and
  generate an output representative of the control signal for input into the crank length control mechanism.

In still another aspect, a computer program product comprising a computer readable storage medium having program instructions embodied therewith, the program instructions executable by a computing device to cause the computing device to:
  determine a crank length for the infinitely variable transmission, a desired modulated input speed of an input-control module, and an output torque of an output shaft of the infinitely variable transmission, wherein the input-control module is configured to control a motion conversion module of an infinitely variable transmission; and
  output a control signal to the input-control module based on the determined crank length, the desired modulated input speed, and the output torque.

Other aspects, features and embodiments of the invention will be more fully apparent from the ensuing disclosure and appended claims.

DETAILED DESCRIPTION, AND PREFERRED EMBODIMENTS THEREOF

Figure 1:
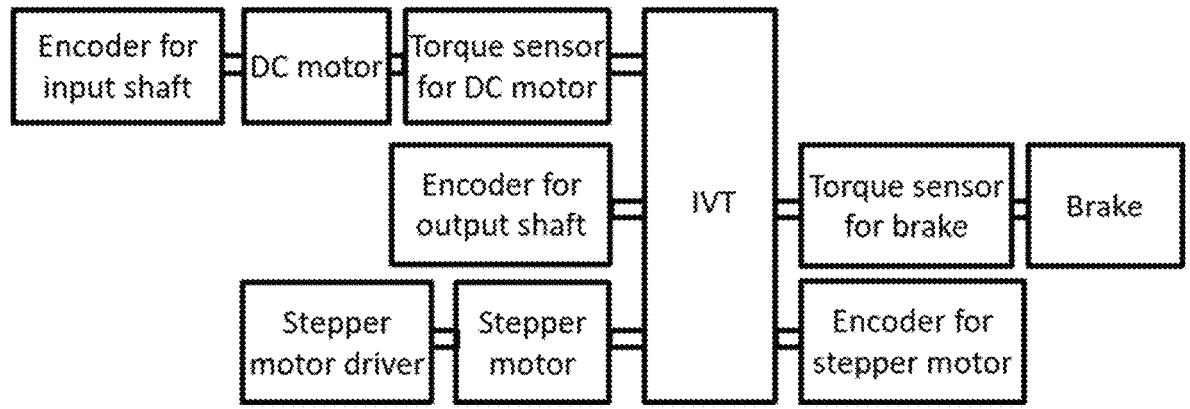
FIG. 1 is a photograph of an experimental setup of the IVT system.

The present invention relates to an infinitely variable transmission.

As used herein, the term "infinitely variable" embraces, but is not limited to a transmission which is capable of operating at a plurality of gear ratios and in which the plurality of gear ratios are changeable in very small, possibly infinitely small, increments over a range of gear ratios. "IVT" is not intended to imply that an infinite rotation speed may be achieved, which, of course, would be impossible, only that a theoretically infinite number of ratios between the speed of the input shaft and the speed of the output shaft may be selected within a predetermined range of ratios. It should also be noted that the output shaft of IVT does not actually operate within a set range of speeds but actually operates within a range of ratios.

The present inventors previously introduced an IVT in [2], which mechanically transmitted a variable input speed to a desired constant output speed with a continuously variable speed ratio. The continuously variable speed ratio of the IVT was adjustable by changing the crank length in the scotch yoke systems (SYSs). The noncircular gear pair was designed to eliminate speed variations of the output speed of the IVT.

High operation performance of IVTs requires an accurate and stable control design for continuously variable input-to-output speed ratios, including for high-torque and low-speed conditions. This can be achieved by accurately tracking a prescribed input-to-output speed ratio reference and simultaneously reducing instantaneous variations of the input-to-output speed ratio of the IVT. Towards that end, a nonlinear input-to-output speed ratio control combined with an integral time-delay feedback control was developed to adjust the input-to-output speed ratio of an IVT system for a desired constant output rotational speed with any input and output load. The input-to-output speed ratio of the IVT system was analyzed by using a nonlinear dynamic model of the IVT with a permanent magnetic direct current motor and a magnetic brake. The input-to-output speed ratio control for the IVT system involves a forward speed controller and a crank length controller for varying operating conditions, such as input speed and speed ratio changes. Connections between the proposed control strategy and system identification were exploited to achieve high operation performance of the IVT. Experimental investigations were carried out to test the validity of the control results in terms of the proposed control strategy for the IVT system. An instrumented rotational speed measurement system was designed so that the quantities necessary for the time-delay control variable could be measured. Experimental results show that input-to-output speed ratios of the IVT with the proposed control strategy can achieve an excellent tracking response for the desired constant output rotation speed and reduce speed fluctuations of the output speed of the IVT by the time-delay feedback control. Further, using the present invention, the input-to-output speed ratio and noises of the IVT system can, to a good extent, be eliminated or reduced by the time-delay control.

IVTs are known in the art and are increasingly being used in vehicles ranging from automobiles to farm equipment and everything in between. The present disclosure is intended to protect the use of the IVT system described herein for said vehicles. IVTs operating at high-torque, low-speed conditions would also be advantageous for tidal current energy converters (TCECs) to harvest the kinetic energy of tidal flows. A significant advantage of tidal current energy is that it can be almost perfectly forecasted over a long time [28]. Thus, incorporating tidal current energy generation into an electricity system should be more stable than other forms of renewable generation that are relatively unpredictable [29]. Additionally, tidal currents are hardly affected by weather conditions [30]. Working principles and structures of TCECs are similar to those of wind turbine systems [31, 32]. Both are devices that convert the kinetic energy of fluid into electrical power. The total tidal power has a cubic relation with the tidal current speed [33]: $P=0.5\rho AV^3$, where $\rho$ is the density of seawater, A is the swept area of a hydro-turbine, and V is the tidal current speed. TCECs start working when the tidal current speed reaches a minimum speed called the cut-in speed and continue generating electricity up to a specific tidal current speed called the rated speed, where the maximum power is produced by the generator. Currently, TCECs require the current speed to be greater than 2.25 m/s, which is only achieved at water depths between 25 and 50 m to yield practical power with a larger swept area of turbine blades and a high tidal current speed [34]. However, only less than 2% of sea regions with high-tidal current speeds can satisfy the requirement of the existing tidal current harvesting systems [35, 36]. Since the density of seawater is high, more than 800 times that of air, tidal currents can generate a considerable amount of energy with low tidal current speeds (1.0-1.5 m/s) [37]. Sea regions with those low-tidal current speed are widely distributed along the US continental shelf edge, which are more than 70% of the US's sea space [35].

TCECs consist of three key components, i.e., rotors with a number of turbine blades, transmissions, and generators [38]. Rotors rotate with the hydrodynamic effect of tidal flows. Transmissions convert low rotation speeds of the rotors to high rated speeds of generators. The electrical power can be generated by generators and has to be converted from alternating current (AC) to direct current (DC) and back to AC. Shafts of rotors and generators are directly coupled via mechanical gearboxes or indirectly coupled via hydraulic transmissions [39, 40]. Three key components are mounted on a tower structure or a floating structure to withstand harsh environmental loads. The rated speed of a TCEC mainly depends on its generator capacity. If the cut-in speed is too low, the corresponding speed ratio of its transmission must be very small to harvest enough tidal current energy.

There are two types of transmissions for TCEC applications, i.e., mechanical gearboxes [41] and hydraulic transmissions [42, 43]. Mechanical gearboxes involve multistage planetary gear transmissions with constant speed ratios and CVTs with variable speed ratios. Current TCECs try to harvest more tidal energy by using permanent magnet generators (PMGs) and large planetary gear transmissions [44]. While these systems can lower the cut-in speed and harvest variable tidal power, two main drawbacks still exist in their practical applications. First, the variable-frequency power generated has to be converted from AC to DC and back to AC by a PMG, which is expensive and failure-prone, and requires costly equipment repair; they also tend to make other parts of a TCEC fail prematurely. Second, while planetary gear transmissions with constant speed ratios can reduce the cut-in speed, speed fluctuations cannot be eliminated but enlarged, which would increase the workload of generators, and the power increase cannot justify the size of the electronic and electric equipment [45]. Power converters should be used in TCECs with planetary gear transmissions to convert the variable-frequency power to grid-compatible constant-frequency power. CVTs enable continuous variation of their speed ratios and torque conversion in a wide range of speed ratios to allow generators to work in more efficient conditions [46]. CVTs convert torques based on friction between pulleys and a belt or a chain, power loss of CVTs is large under low-speed and high-torque conditions when sliding between pulleys and the belt or the chain occurs under a large torque. In order to improve the capability of large-torque conversion of TCECs, some power-split systems are used in combination with traditional CVTs to improve the capability of large torque conversion, such as hydrostatic transmissions [47-49] and flywheel systems [50]. A hydraulic transmission is designed with a displacement pump and multiple fixed or variable-displacement motors. The displacement pump converts the kinetic energy of a rotor to the potential energy of pressurized fluid. The motors convert the potential energy of pressurized fluid back to the kinetic energy of the shaft of the generator [43]. While speed ratio ranges of hydraulic transmissions are large, their low efficiency is still a distinct drawback for TCEC applications, which is approximately 70% [48, 51]. Hence, a variable speed ratio transmission needs to be used for TCECs under low-speed and high-torque conditions, which costs less and has more efficiency.

The IVT designed in [2] can be used for high-torque and low-speed conditions, and the variable range of the speed ratio of the IVT is larger than that of a continuously variable transmission and can start from zero. The larger variable range of the speed ratio of the IVT may allow a TCEC to virtually operate in its optimal speed range that is independent of the speed of the hydro-turbine to maximize harvesting efficiency. The primary goal of the control system of the IVT, as described herein, is to adjust the crank length to its optimal value for high operation performance of the TCEC. A time-delay feedback control with an open-loop control was designed [1] for the IVT system that includes the IVT, a permanent magnet DC motor, and a magnetic brake. Simulation results showed the time-delay feedback control can reduce speed fluctuations of the output speed of the IVT. Since the IVT can provide a continuously variable speed ratio, it can ensure high-efficiency performance of a hydro-turbine with a variable tidal current speed. To achieve maximum efficiency over most of the working range of the hydro-turbine, it should operate at a particular value of the tip-speed ratio (TSR). The control strategy of the IVT can be achieved by accurately tracking a prescribed speed ratio reference and simultaneously reducing instantaneous fluctuations of the output speed based on the TSR of the hydro-turbine and the desired output speed of the IVT.

The present invention presents new control strategies with closed-loop controls and an integral time-delay feedback control for the IVT system to improve its control performance. Two closed-loop controllers—a crank length controller and a forward speed controller—were developed to achieve control objectives of tracking the speed ratio of the IVT that corresponds to the desired rotation speed of the generator and the desired rotation speed of the hydro-turbine, respectively. The time-delay feedback control is developed to reduce fluctuations of the output speed of the IVT system. The key merit of the time-delay feedback control is that the resulting control strategy of the IVT system can improve control performance of its speed ratio with large speed variation that is induced by the variable input speed. By building on the previous work [1], main contributions of this work are (1) improvement of the forward speed controller with the closed-loop control based on the TSR of the hydro-turbine; (2) system identification of the IVT system to ensure control accuracy; and (3) experimental investigation of the proposed control strategy of the IVT system.

For the purposes of the instant application, the invention relating to methods of use, a transmission, a transmission control system, and a computer program product according to the present invention can be implemented in any of a variety of "prime movers" including, but not limited to, an electric engine, an internal combustion engine, or a turbine-driven apparatus. The engines may be used, for example, in a passenger or other type of motor-powered vehicle, e.g., a passenger vehicle, tractor/trailer, a military vehicle, marine vehicle, airplanes, helicopters, all-terrain vehicle, construction equipment, and the like. A particular aspect of an IVT transmission is the ability to use the transmission in a variety of applications which have low or high torque requirements. For example, vehicles such as snowmobiles have relatively low torque requirements whereas a semi tractor-trailer will have a larger torque requirement. Further, the IVT can be used in a variety of other applications including, but not limited to, a conveyor system, an elevator, ski lift, gondola, or other people-mover system. Because the IVT described herein has high efficiency for low and high fluid speeds, the IVT can be included in a power generation system such as a wind, water or hydraulic power generator, wherein the turbine in said system is selected from the group consisting of a horizontal axis fluid turbine, a vertical axis fluid turbine, and a hybrid vertical axis fluid turbine. An example of a hybrid vertical axis fluid turbine was disclosed in U.S. Patent Application Publication No. 2020/0332764 published on Oct. 22, 2020 in the name of Meilin Y U and Weidong Z H U, and is incorporated by reference herein in its entirety.

As defined herein, the individual gears in the "pair of meshed gears" or "gear pair" in the IVT can be substantially circular or noncircular. In one embodiment, the gear pair comprises two substantially circular gears that mesh. In another embodiment, the gear pair comprises two noncircular gears that mesh. It should be understood by the person skilled in the art that a "substantially circular" gear is intended to be perfectly circular however minor manufacturing errors occurred.

In a first aspect, an IVT control system is described, said IVT control system comprising:
  a crank length controller comprising electronic components configured to:
    determine a desired output rotation speed of an IVT; and
    determine a control signal for a crank length control mechanism based on the determined output rotation speed; and
  a crank length control mechanism configured to receive the control signal and control the crank length of the IVT based on the control signal.

With regards to the desired output rotation speed of the first aspect, the desired output rotation speed is determined based on a desired output speed and a desired input speed of the IVT. In one embodiment, the desired output rotation speed is determined based on the equation:

$$f_{cr}^* = \frac{\sqrt{2}\, p r_{og} w_u^*}{4 i_n w_n^*}$$

wherein $r_{og}$ is a pitch radius of an output gear of the IVT, $w_u^*$ is a desired output speed of the IVT, $i_n$ is the speed ratio of the gear pair, e.g., a noncircular gear pair, and $w_n^*$, is a desired input speed of the IVT.

With regards to the crank length controller of the first aspect, the crank length controller is configured to:
  determine an estimated output rotation speed of the IVT; and
  determine the control signal for the crank length control mechanism based on the estimated output rotation speed.
In one embodiment, the crank length controller is configured to determine the control signal based on the equation:

$$\ell_{cr} = l \Delta w_u,$$

wherein $\ell_{cr}$ is the crank length, l is an integral gain, and $\Delta w_u$ is a tracking error of the crank length controller. The crank length controller is configured to change the control signal for adjusting the crank length based on an estimate of the output rotation speed of the IVT. For example, the crank length controller can be configured to use a look-up table to determine the crank length and to determine the control signal.

In a second aspect, an IVT control system is described, said IVT control system comprising:
  an input-control module configured to control a motion conversion module of an IVT; and
  a forward speed controller comprising electronic components configured to:
    determine a crank length for the IVT, a desired modulated input speed of the input-control module, and an output torque of an output shaft of the IVT; and
    output a control signal to the input-control module based on the determined crank length, the desired modulated input speed, and the output torque.

With regards to the input-control module of the second aspect, an electronic motor is included and configured to receive the control signal and to control modulation of an input rotation speed of the input-control module based on the control signal. Further, the forward speed controller comprises a time-delay feedback controller configured to:
  determine an input speed of the IVT; and
  adjust the control signal to the input-control module based on a tracking error of the output speed of the IVT.

The IVT control system of the second aspect can further comprise at least one of:
  (I) a crank length controller comprising electronic components configured to:
    determine a desired output rotation speed of the IVT; and
    determine the crank length based on the desired output rotation speed;
  (II) a torque sensor operatively connected to the output shaft of the IVT, configured to measure the output torque of the output shaft, and configured to output a signal representative of the measured output torque to the electronic components of the forward speed controller; or
  (III) both (I) and (II).

In a third aspect, an IVT control system is described, said IVT control system being a combination of the IVT control system of the first aspect and the IVT control system of the second aspect, said IVT control system thus comprising:
  a crank length controller comprising electronic components configured to:
    determine a desired output rotation speed of an IVT; and
    determine a control signal for a crank length control mechanism based on the determined output rotation speed;
  a crank length control mechanism configured to receive the control signal and control the crank length of the IVT based on the control signal;
  an input-control module configured to control a motion conversion module of the IVT; and
  a forward speed controller comprising electronic components configured to:
    receive the crank length;
    determine a desired modulated input speed of the input-control module and an output torque of an output shaft of the IVT; and
    output a control signal to the input-control module based on the determined crank length, the desired modulated input speed, and the output torque.

In a fourth aspect, a method for control of an IVT is described, the method comprising:
  determining a desired output rotation speed of the IVT; and
  determining a control signal for a crank length control mechanism based on the determined output rotation speed; and at a crank length control mechanism:
receiving the control signal; and
controlling the crank length of the IVT based on the control signal.

The method of the fourth aspect can further comprise at least one of:
(I) determining the desired output rotation speed based on a desired output speed and a desired input speed of the IVT;
(II) determining the desired output rotation speed based on the equation:

$$\ell_{cr}^* = \frac{\sqrt{2}\, pr_{og} w_u^*}{4 i_n w_n^*}$$

wherein $r_{og}$ is a pitch radius of an output gear of the IVT, $w_u^*$ is a desired output speed of the IVT, $i_n$ is the speed ratio of the gear pair, e.g., a noncircular gear pair, and $w_n^*$ is a desired input speed of the IVT;
(III) determining an estimated output rotation speed of the IVT; and
determining the control signal for the crank length control mechanism based on the estimated output rotation speed;
(IV) determining the control signal based on the equation:

$$\ell_{cr} = l\Delta w_u,$$

wherein $\ell_{cr}$ is the crank length, l is an integral gain, and $\Delta w_u$ is a tracking error of the crank length controller;
(V) changing the control signal for adjusting the crank length based on an estimate of the output rotation speed of the IVT;
(VI) using a look-up table to determine the crank length and to determine the control signal; or
(VII) any combination of (I)-(VI).

In a fifth aspect, a method for control of an IVT is described, the method comprising:
determining a crank length for the IVT, a desired modulated input speed of an input-control module, and an output torque of an output shaft of the IVT, wherein the input-control module is configured to control a motion conversion module of an IVT; and
outputting a control signal to the input-control module based on the determined crank length, the desired modulated input speed, and the output torque.

The input-control module can includes an electronic motor configured to receive the control signal and to control modulation of an input rotation speed of the input-control module based on the control signal.

The method of the fifth aspect can further comprise at least one of:
(I) determining a desired output rotation speed of the IVT; and
determining the crank length based on the desired output rotation speed;
(II) providing a torque sensor operatively connected to the output shaft of the IVT; and
using the torque sensor to measure the output torque of the output shaft;
(III) determining an input speed of the IVT; and
adjusting the control signal to the input-control module based on a tracking error of the output speed of the IVT; or
(IV) any combination of (I)-(III).

In a sixth aspect, a computer program product comprising a computer readable storage medium having program instructions embodied therewith, the program instructions executable by a computing device to cause the computing device to:
determine a desired output rotation speed of an IVT; and
determine a control signal for a crank length control mechanism based on the determined output rotation speed; and
generate an output representative of the control signal for input into the crank length control mechanism.

In a seventh aspect, a computer program product comprising a computer readable storage medium having program instructions embodied therewith, the program instructions executable by a computing device to cause the computing device to:
determine a crank length for the IVT, a desired modulated input speed of an input-control module, and an output torque of an output shaft of the IVT, wherein the input-control module is configured to control a motion conversion module of an IVT; and
output a control signal to the input-control module based on the determined crank length, the desired modulated input speed, and the output torque.

It should be appreciated that the IVT control systems described in the first, second and third aspects of the invention, the methods described in the fourth and fifth aspects of the invention, and the computer program products of the sixth and seventh aspects can comprise any IVT known in the art. In other words, although the instant invention will be described for use with a specific IVT, it is not limited to same.

In one embodiment, the IVT control systems described in any of the first-seventh aspects of the invention comprise an IVT comprising a pair of meshed gears, an input-control module, and a motion conversion module. In another embodiment, the IVT control systems described in any of the first-seventh aspects of the invention comprise an IVT comprising a pair of meshed gears, an input-control module, and a motion conversion module, wherein the input-control module comprises a first and a second planetary gear set positioned on a secondary shaft, an active control gear positioned on a control shaft, and an idler control gear positioned on an idler shaft, wherein speeds of the control shaft and the idler shaft are controlled by an actuator,
wherein the motion conversion module comprises a first and a second scotch yoke system positioned on an input shaft, a transmitting shaft, and an output shaft,
wherein a driving gear is positioned on the input shaft and wherein a driven gear is positioned on the secondary shaft,
wherein a combination of an input speed from the secondary shaft and speeds of the control shaft and idler shaft constitute an output from the input-control module to the motion conversion module through the first and second planetary gear sets, respectively, wherein output speeds of the first and second planetary gear sets are input speeds of the first scotch yoke system and an output speed of the second planetary gear set is directly transmitted as an input speed to the second scotch yoke system via the transmitting shaft,
wherein a combination of input speeds of the first and second scotch yoke systems are converted to translational speeds which are subsequently converted to rotational speeds of four output gears positioned on the output shaft through four rack-pinion meshings, and wherein the rotational speeds of the four output gears are rectified by one-way bearings and transmitted to the output shaft as an IVT output speed.

The individual gears in the "pair of meshed gears," or "gear pair," in the IVT can be substantially circular or noncircular. In one embodiment, the gear pair comprises two substantially circular gears. In another embodiment, the gear pair comprises two noncircular gears. Importantly, the noncircular gear pair was designed to eliminate speed variations or fluctuations of the output speed of the IVT. The input shaft is connected to a prime mover as defined herein. In one embodiment, the actuator comprises a stepper motor.

IVT Experimental Setup and Control Requirements

Experimental Setup

The IVT system as it is during control tests is shown in FIG. 1. This experimental setup of the IVT system consists of an IVT, a permanent DC motor, a magnetic brake, a stepper motor, two torque sensors, and three angular encoders. The magnetic brake mounted on the output shaft is used to provide a constant torque for loading the gear system meshes while the DC motor provides the power required to operate the IVT system at any desired input rotational speed value. Three angular encoders are mounted on the input shaft, the secondary shaft, and the output shaft of the IVT to measure the corresponding rotational angles, respectively. Meshed gears, scotch yoke systems, and bearings of the IVT are lubricated by Gear Oil VG100 during control tests to provide favorable lubrication conditions to minimize friction and damping. All shafts of the IVT are supported by oversized bearings and a rigid housing to ensure that translational motions and torsional vibration of gear trains are small. The DC motor and the magnetic brake are both mounted on rigid pedestals and connected to the corresponding shafts by couplings to eliminate the eccentric effect. The IVT system was initially tested for $4 \times 10^4$ input cycles with an input load of 40 Nm and an input speed of 100 rpm to assess adhesion of coating of tooth surfaces in the running-in period.

Figure 2:
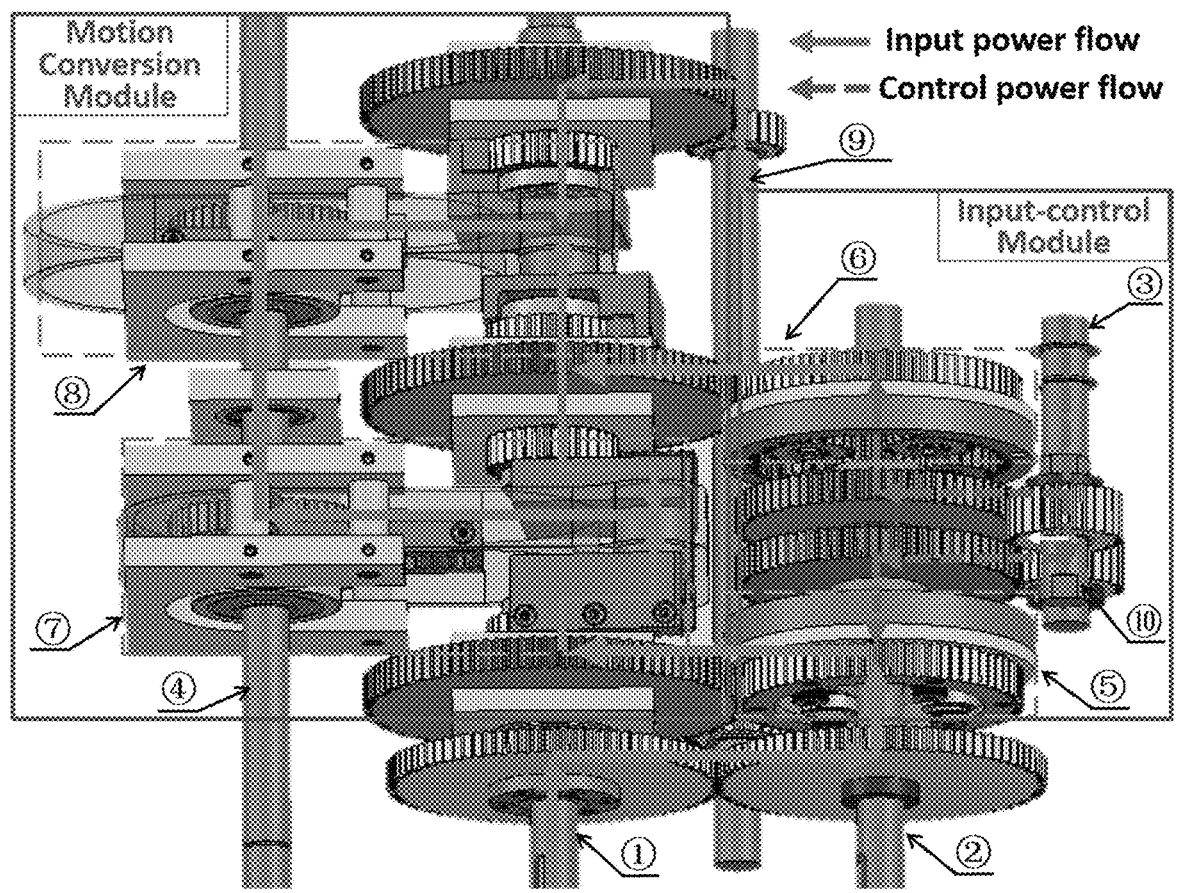
FIG. 2 is a schematic drawing of the IVT of the prior art, where (1) is the input shaft, (2) is the secondary shaft, (3) is the control shaft, (4) is the output shaft, (5) is the first 2K-H planetary gear set (PGS), (6) is the second PGS, (7) is the first scotch yoke system (SYS), (8) is the second SYS, (9) is a transmitter shaft, and (10) is an idler shaft.

A schematic drawing of the IVT that is presented in Wang and Zhu [2] is shown in FIG. 2. The IVT comprises a noncircular gear pair, an input-control module (ICM), and a motion-conversion module (MCM). It should be appreciated by the person skilled in the art that the gear pair can comprise two substantially circular gears. An input rotational speed is first transmitted from the noncircular gear pair to the ICM. Driving and driven noncircular gears are installed on the input shaft and secondary shaft, respectively. With the modulation effect of the noncircular gear pair, a modulated input speed is translated to the secondary shaft in the ICM. A stepper motor mounted on the control shaft in the ICM is used to provide a control speed for adjustment of the input-to-output speed ratio of the IVT. The control speed and modulated input speed are combined by two 2K-H planetary gear sets (PGSs) on the secondary shaft in the ICM. Combined speeds of ring gears of two PGSs are transmitted to SYSs in the MCM. Two SYSs transmit the combined speeds to translational speeds of yokes; four meshed rack-pinion sets then convert translational speeds of yokes to rotational speeds of four output gears. The output speed of the IVT is the maximum rotational speed of four output gears that are rectified by one-way bearings.

Kinematic Model of the IVT

The IVT was designed for the conversion of variable power from the prime mover to a constant output speed with a continuously variable speed ratio. The input rotational speed and the input torque that are loaded on the input shaft are denoted as $w_p$ and $t_p$, respectively. The output rotation speed and the output torque of the output shaft of the IVT are denoted as $w_u$ and $t_u$, respectively. The input-to-output speed ratio i of the IVT is defined as $i=w_p/w_u$. The input rotational speed $w_p$ is transmitted from the DC motor to the gear pair, as shown in FIG. 2. The rotational speed $w_n$ of the driven gear (NG2) that is the modulated rotation speed of the ICM can be represented as $$w_n = \frac{w_p}{i_n} \quad (1)$$

where $i_n$ is the speed ratio of the gear pair, e.g., a noncircular gear pair. Based on the kinematic model of the IVT in [27], the speed ratio of the IVT can be represented as $$i = \frac{w_p}{w_u} = \frac{\sqrt{2}\, pr_{og}}{4\ell_{cr}} \quad (2)$$

Since the pitch radius $r_{og}$ of the output gear is constant, the input-to-output speed ratio of the IVT is determined by the crank length $\ell_{cr}$. The crank length $\ell_{cr}$ is changed with the rotation angle $\theta_{sg}$ of control gears that can be obtained by $\theta_{sg}=\int \omega_{sg} dt$.

The IVT system includes a permanent magnetic DC motor that provides the power required to operate the IVT system, a magnetic brake that provides a variable load for the IVT system, and the IVT. There are two submodels in the dynamic model of the IVT system, i.e., a dynamic model of the magnetic DC motor and a dynamic model of the IVT. There are also some assumptions that all components of the IVT system are considered as rigid bodies and friction in the IVT system is neglected. In the experimental setup of the IVT system, the input speed $w_p$ and the input torque $t_p$ are provided by the permanent magnetic DC motor. A dynamic model of the permanent magnetic DC motor can be represented as $$\begin{cases} L_a \dot{I}_a = -R_a I_a - k_e w_p + V_p \\ J_{n1} \dot{w}_p = k_t I_a - b w_p - t_p \end{cases} \quad (3)$$

where $L_a$ is the armature inductance, $R_a$ is the armature resistance, $I_a$ is the armature current, $k_e$ is the velocity constant, $V_p$ is the supply (armature) voltage of the DC motor, $J_{n1}$ is the moment of inertia of the driving gear (NG1), e.g., a noncircular gear, $k_t$ is the torque constant, b is the damping coefficient, and the overdot means time differentiation. Substituting Eq. (1) into Eq. (3), the input torque of the IVT system can be represented as $$t_p = \frac{k_t}{R_a} V_p - \frac{k_t k_e}{R_a} i_n w_n - J_{n1} i_n \dot{w}_n - J_{n1} w_n^2 \frac{di_n}{dq_n} \quad (4)$$

where the partial derivative of $i_n$ with the respect to $q_n$ can be represented as $$\frac{di_n}{dq_n} = -\frac{p}{2\sqrt{2}} \sin\left(\mathrm{mod}\left(q_n + \frac{p}{4}, \frac{p}{2}\right) - \frac{p}{4}\right) \quad (5)$$

in which $$\text{mod}\left(q_n + \frac{p}{4}, \frac{p}{2}\right)$$

means the remainder of the division of $$q_n + \frac{p}{4}$$

by $$\frac{p}{2}.$$

Rotational speeds $w_r$ of ring gears of PGSs are proportional to the rotational speed $w_n$ of the driven gear (NG2), e.g., a noncircular gear. The rotational speed $w_r$ of crank gears and the rotational speed of the cranks $w_{cr}$ are also proportional to the rotational speed $w_n$ of the driven gear in the ICM. The kinetic energy of the ICM can be represented as $$T_1 = \tfrac{1}{2} J_a w_n^2 \tag{6}$$

where $J_a$ is the effective moment of inertia of the kinetic energy with respect to $w_n$, i.e., $J_a$=0.0346 kg·m². Translational speeds of yokes of two SYSs and rotational speeds of four output gears are proportional to $\ell_{cr} w_n$. The kinetic energy of SYSs and output gears can be represented as $$T_2 = \tfrac{1}{2} J_b \ell_{cr}^2 w_n^2 \tag{7}$$

where $J_b$ is the effective mass of the kinetic energy with respect to $\ell_{cr} w_n$, i.e., $J_b$=2.9 kg. Rotational speeds of the output shaft and the brake are proportional to $i_n \ell_{cr} w_n$. The kinetic energy of the output shaft and the brake can be represented as $$T_3 = \tfrac{1}{2} J_c i_n^2 \ell_{cr}^2 w_n^2 \tag{8}$$

where $J_c$ is the effective mass of the kinetic energy with respect to $i_n \ell_{cr} w_n$, i.e., $J_c$=36 kg. The potential energy of the IVT is $$V_t = m_r g [\cos(q_n) - \sin(q_n)] \ell_{cr} \tag{9}$$

where $m_r$ is the mass of a roller, i.e., $m_r$=1 kg, and g is the gravitational acceleration. The generalized force of the IVT system can be represented as $$Q_t = i_n t_p - \frac{2\sqrt{2}}{p r_{og}} i_n t_u \tag{10}$$

The total kinetic energy of the IVT can be represented as $$T_{total} = T_1 + T_2 + T_3 - V_t \tag{11}$$

Based on Lagrange's equations, the system equation of the IVT system can be represented as $$\frac{d}{dt} \frac{\partial T_{total}}{\partial w_n} - \frac{\partial T_{total}}{\partial q_n} = Q_t \tag{12}$$

With Eqs. (4), (10), and (12), a dynamic equation of the IVT system can be represented as $$J(q_n, \ell_{cr}) \ddot{q}_n = G(q_n) \ell_{cr} - \tfrac{1}{2} J_q(q_n) \dot{q}_n^2 - V_k(q_n) \dot{q}_n + F_p(q_n, V_p) - F_u(q_n, t_u) \ell_{cr} \tag{13}$$

where $J(q_n, \ell_{cr})$ is the sum of moments of inertia of components in the IVT system that can be represented as $$J(q_n, \ell_{cr}) = J_a + J_b i_n^2 + J_c i_n^2 \ell_{cr}^2 + J_{n1} \ell_{cr} \tag{14}$$

G(q) is the gravitational acceleration function of the potential energy of the IVT system that can be represented as $$G(q_n) = g[\sin(q_n) + \cos(q_n)] \tag{15}$$

$J_q(q_n)$ is the derivative of the sum of moments of inertia of the IVT system with respect to $q_n$, which can be represented as $$J_q(q_n) = 2(J_c \ell_{cr}^2 + J_{n1}) i_n \frac{di_n}{dq_n} \tag{16}$$

$V_k(q_n)$ is the kinetic energy of the IVT system with respect to $\dot{q}_n$ that can be represented as $$V_k(q_n) = \frac{k_t k_e}{R_a} i_n^2 \tag{17}$$

$F_p(q_n, V_p)$ is the kinetic energy generated by the DC motor, which can be represented as $$F_p(q_n, V_p) = \frac{k_t}{R_a} i_n V_p \tag{18}$$

and $F_u(q_n, t_u)$ is the kinetic energy generated by the brake, which can be represented as $$F_u(q_n, t_u) = \frac{2\sqrt{2}}{p r_{og}} i_n t_u \tag{19}$$

Based on Eq. (22), the input-to-output speed ratio i of the IVT is determined by the rotational angle $q_{sg1}$ of the first control gear which is equal to the rotational angle $q_s$ of the control shaft. The rotational angle $q_s$ of the control shaft is controlled by the stepper motor that can be represented as $$q_s = q_{sg1} = \frac{p V_s}{n_{spr} L_s I_s} \tag{20}$$

where $V_s$, $L_s$, and $I_s$ are the applied voltage, the armature inductance, and the armature current of the stepper motor, respectively, and $n_{spr}$ is the number of steps per revolution. Based on Eqs. (2) and (20), the crank length $\ell_{cr}$ can be also represented as $$\ell_{cr} = \frac{p V_s}{2 n_{spr} L_s I_s} \tag{21}$$

Nonlinear Model-Based IVT Controllers

Figure 3:
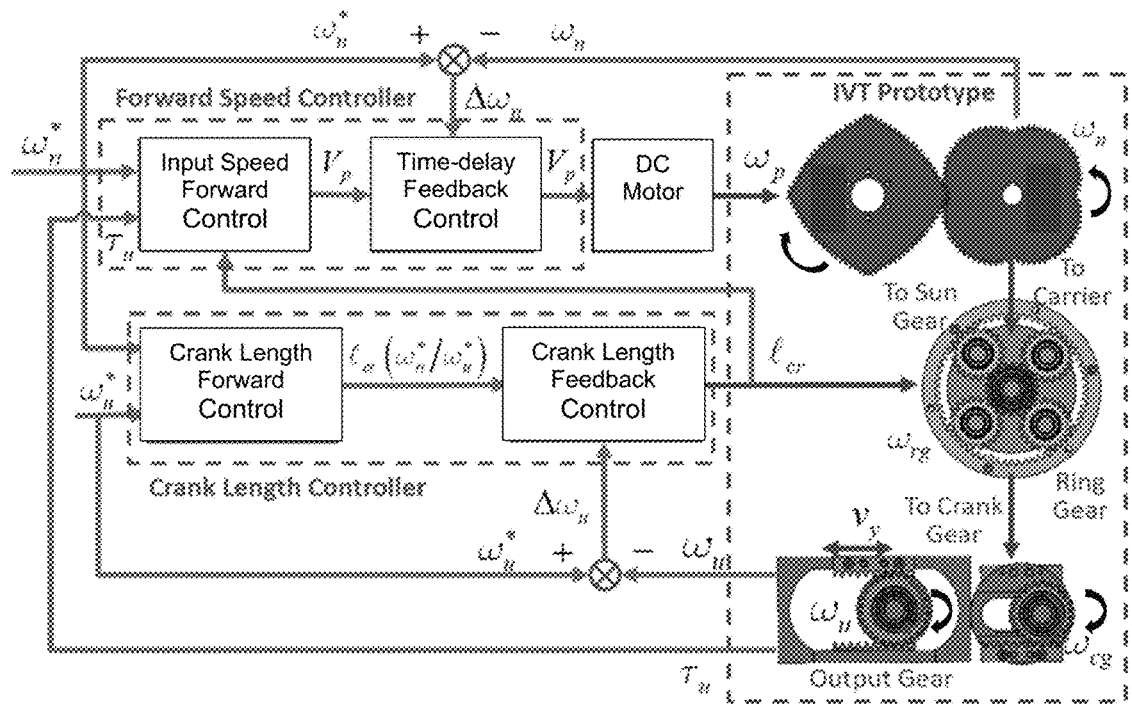
FIG. 3 is a schematic of the control structure for the IVT system.

FIG. 3 shows the block diagram of the proposed control scheme of the IVT system. The proposed control problem addressed herein is the feedback design for two IVT controllers, which are a crank length controller and a forward speed controller. The input-to-output speed ratio i of the IVT system is controlled by the forward speed controller and the crank length controller. The crank length controller is designed to adjust the speed ratio for any desired output speed of the IVT. The forwards speed controller is used to track a desired input speed for maximizing efficiency of the prime mover with time-delay feedback control that can reduce speed fluctuations of the output speed. Since the dynamic performance of the IVT system strongly depends on the rotational angle q of the gear, e.g., a noncircular gear, and the crank length $\ell_{cr}$ according to Eq. (13), the control behavior and the input-to-output speed ratio change with the rotational speed $w_p$ of the DC motor and the rotational angle $q_s$ of the stepper motor. Hence, the goal of the proposed control strategy of the IVT system is to make the average of the output speed $w_n$ of the IVT over 2p in $q_n$ converge to a desired output speed for any $V_p$ and $t_u$ that are input and output loads, respectively, by adjusting the crank length $\ell_{cr}$, while the DC motor operates on the rotational speed of the prime mover (e.g., automobile, hydro-turbine, etc.). Detailed control objectives include: the crank length controller generates a desired crank length f*, that depends on the speed ratio of the desired input speed $w_n$* and the output speed $w_u$* required in the IVT system; and the forward speed controller forces the modulated input speed $w_n$ of the ICM to approach the desired input speed $w_n$*. Additionally, the time-delay feedback controller can reduce speed fluctuations of the output speed.

Crank Length Controller

The crank length controller involves a crank length forward control and a crank length feedback control. Based on Eq. (2), the crank length forward control is designed to calculate the desired crank length that can be represented as $$\ell_{cr}^* = \frac{\sqrt{2}\, pr_{og} w_u^*}{4 i_n w_n^*} \tag{22}$$

Figure 4:
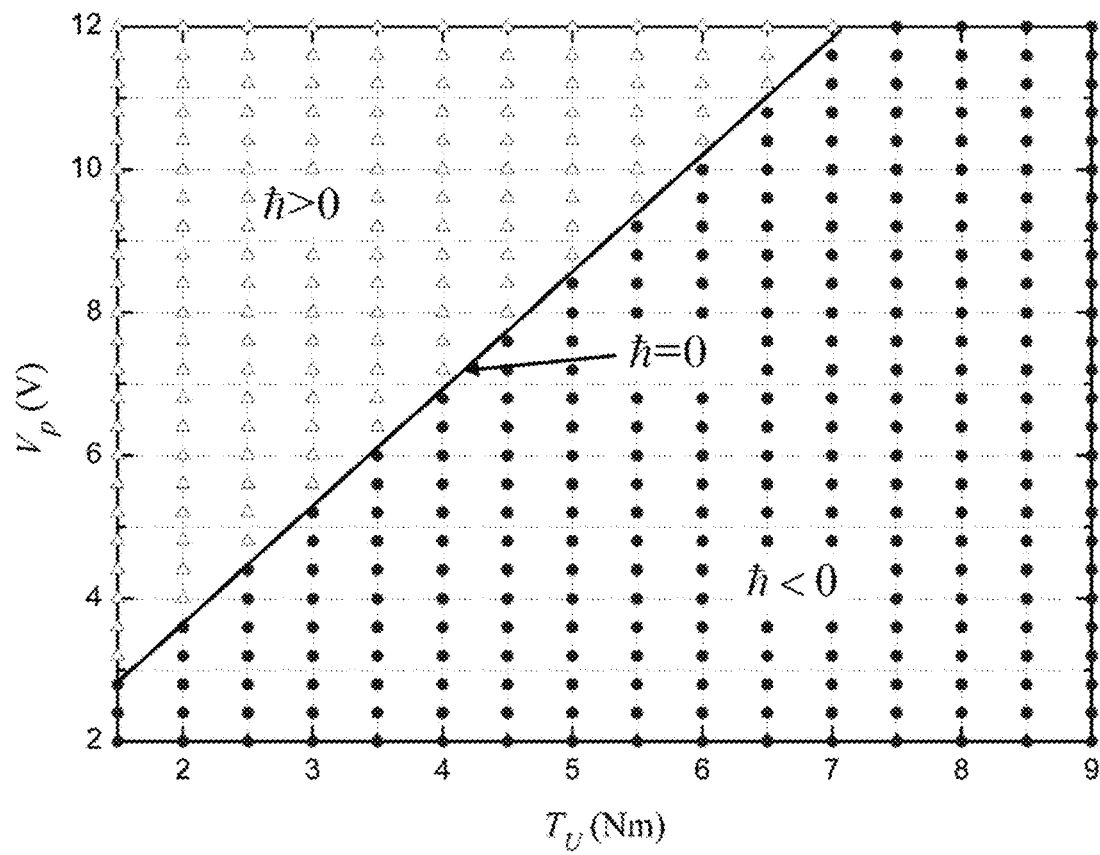
FIG. 4 illustrates the boundary $\hbar=0$ to distinguish different cases for the crank length controller; $\hbar>0$ on the upper left side of the boundary and $\hbar<0$ for the case in the other side of the boundary.

A look-up table is developed for the shift schedule of the crank length controller based on the maximal crank length $\ell_{cr\,max}$. If the calculated crank length is smaller than or equal to the maximal crank length $\ell_{cr\,max}$, the crank length $\ell_{cr}$ is a function of the desired modulated input speed $w_n$* and the desired output speed $w_u$* which is denoted as $\Re(w_u^*; w_n^*)$; if the calculated crank length is larger than the maximal crank length $\ell_{cr\,max}$, the crank length $\ell_{cr}$ is set to the maximal crank length $\ell_{cr\,max}$. In order to distinguish different cases in the look-up table based on the armature voltage $V_p$ of the DC motor and the output torque $t_u$ of the output shaft, a boundary function of the crank length controller in working regions of the armature voltage $V_p$ of the DC motor and the output torque $t_u$ of the output shaft can be defined by $$\hbar = \Re(w_u^*; w_n^*) - \ell_{cr\,max} \tag{23}$$

which is shown in FIG. 4. Hence the look-up table of the crank length controller of the IVT system can be represented as $$\ell_{cr}(w_u^*; w_n^*) = \begin{cases} \Re(w_u^*; w_n^*), & \text{if } \hbar \le 0 \\ \ell_{cr\,max}, & \text{if } \hbar > 0 \end{cases} \tag{24}$$

The crank length feedback control is designed to adjust the crank length of the IVT for the desired output speed. Since one has no access to the mean output speed $w_n$ of the IVT in real time, the average of the output speed of the IVT in a period of 2p prior to the current rotation position is used as a feedback variable. The tracking error of the crank length controller can be represented as $$\Delta w_u = w_u^* - \frac{2p}{\int_{q_n(t)-2p}^{q_n(t)} \frac{1}{w_u}\, ds} \tag{25}$$

The crank length controller can be represented as $$\ell_{cr} = l\Delta w_u \tag{26}$$

where l is the integral gain that is used to control the changing rate of the crank length, which can be determined in control experiments. In order to achieve control of the output speed $w_u$ of the IVT, the average of the tracking error $\Delta w_u$ in a period of 2p needs to asymptotically approach zero. The crank length $\ell_{cr}$ that is generated by the crank length controller is used in the forward speed controller.

Forward Speed Controller

An input speed forward control was designed to obtain the corresponding armature voltage $V_p$ of the DC motor to the desired modulated input speed $w_n$*. The modulated input speed $w_u$ of the ICM is a periodic variable and the rotation angle $q_n$ of the driven gear, e.g., a noncircular gear, can be represented as $q_n(t)=\int_0^t w_n(t)ds$. Since the modulated input speed $w_n$ of the ICM is always positive, the dynamic equation of the IVT system can be represented as (27)

$$J(q_n, \ell_{cr}) w_n w_n' = M - \tfrac{1}{2} J_q(q_n) w_n^2 - V_k(q_n) w_n \tag{27}$$

where a prime denotes the derivative of a function with respect to $q_n$, $w_n w_n'$ is equal to $\dot w$, $J_q(q_n)$ is the derivative of the sum of moments of inertia of the IVT system with respect to $q_n$, $V_k(q_n)$ is the kinetic energy of the IVT system, and $$M = G(q_n) \ell_{cr} + F_p(q_n, V_p) - F_u(q_n, t_u) \ell_{cr} \tag{28}$$

where $G(q_n)$ is the gravitational acceleration function of the potential energy of the IVT system, $F_p(q_n, V_p)$ is the kinetic energy generated by the DC motor, and $F_u(q_n, t_u)$ is the kinetic energy generated by the brake. A coordinate transform is defined as $$t(q_n) = \int_0^{q_n} \frac{1}{w_n}\, ds$$

based on the bijective map between $q_n$ and $\ell_{cr}$. The right-hand side of Eq. (27) is continuous with respect to $w_n$, and existence of a periodic solution of Eq. (27) and its convergence have been proven [63]. As mentioned above, the control goal is to operate the rotation speed of the DC motor to force the modulated input speed $w_n$* with $q_n = w_n^* t + \Delta q_n$, wherein $\Delta q_n$ is a periodic variable with the zero mean. To quantify the control goal of the forward speed controller, the tracking error of the forward speed controller is defined as $$\Delta w_n = w_n^* - \bar{w}_n \tag{29}$$

where $\bar{w}_n$ is the average of the modulated input speed $w_n$ of NG2 in a period of 2p prior to the current rotation position. The time-delay variable can be represented as [63]

$$\bar{w}_n = \frac{2p}{\int_{q_n(t)-2p}^{q_n(t)} \frac{1}{w_n} ds} \quad (30)$$

In order to achieve control of the modulated input speed $\Delta w_n$ of the ICM, the average of the tracking error $\Delta w_n$ in a period of 2p needs to asymptotically approach zero as the rotation angle $q_n$ of the driven gear increases; hence, Eq. (29) should approach zero. According to Eqs. (14), (16), and (28), J, $J_q$, and M are functions of $q_n$, $\ell_{cr}$, $V_p$, and $t_u$. The crank length $\ell_{cr}$ is generated by the crank length controller. The output torque $t_u$ of the output shaft can be measured by the torque meter, but cannot be controlled. The armature voltage $V_p$ of the DC motor can serve as the control variable of the forward speed controller. The time-delay feedback control of the IVT system can be represented as $$\begin{cases} Jw'_n = \frac{M}{w_n} - \frac{1}{2}J_q(q_n)w_n - V_k(q_n) \\ V'_p = l_1\Delta w_n + l_2(w_n - w_T) \end{cases} \quad (31)$$

where $l_1$ is the integral gain, $l_2$ is the damping gain, and $w_T = w_n(q_n-2p)$. The goal of the time-delay feedback control is to select $l_1$ and $l_2$ for fast convergence of Eq. (31) to the desired armature voltage $V_p$ of the DC motor and the output torque $t_u$ of the output shaft in their working regions that are $V_p \in [2, 12]$ V and $t_u \in [1.5, 9]$ Nm, respectively.

System Identification

To develop the control model that is applicable to a desired speed ratio of the IVT system, system parameters and continuous time signals of the DC motor and the IVT are identified and used to describe nominal behaviors of the IVT system. The pursued approach to obtain these system parameters of an approximation model of the true IVT system is to perform experiments on the closed-loop system in FIG. 3. The DC motor of the IVT system is considered as one unit here. The manipulated variable is the armature voltage $V_p(t)$ of the DC motor. Measured signals of the DC motor are the armature voltage 9, the armature current $\hat{I}_a$, the input torque $\hat{t}_p$, and the angular velocity $\hat{w}_p$. System parameters of the DC motor are shown in Table. 1. It is understood by the person skilled in the art that these system parameters represent one embodiment of a DC motor and are not intended to limited the invention in any way.

TABLE 1

System Parameters of the DC Motor

| Item | Value |
|---|---|
| Armature inductance $L_a$ (mH) | 1.476 |
| Armature resistance $R_a$ ($\Omega$) | 0.487 |
| Torque constant $k_t$ (Nm/A) | 0.0479 |
| Damping coefficient $\beta$ | 0.43 |
| Moment of Inertia of NG1 $J_{n1}$ (kg · m$^2$) | 0.0214 |
| Velocity constant $k_e$ (V/rad/s) | 0.048 |

System parameters of the IVT that are the nonlinear part of the IVT system can be estimated based on the system parameters of the DC motor. Output signals of the output torque of the $\hat{t}_p$ can be transformed to frequency domain via discrete Fourier transform (DFT) for a standard DFT grid $\Omega_p$ that is $$\Omega_p = \{0.05; 0.10; 0.20; 0.30; 0.40; 0.50; 0.60; 0.70; 0.80, \quad (32)$$
$$\ldots\ldots, 1.0; 2.0; 3.0; 4.0; 5.0; 6.0; 7.0; 8.0; 9.0; 10.0,$$
$$\ldots\ldots, 14.0; 18.0; 22.0; 26.0; 30.0; 34.0; 38.0; 42.0; 46.0\}$$

Based on Eqs. (27) and (28), the discretizing continuous-time model of the IVT system with $k=t/t_0$. To avoid excessive amplitudes of input signals of the armature voltage $\hat{V}_p$ of the DC motor, the phases $\varphi_i$ of input signals of the armature voltage $\hat{V}_p$ of the DC motor are chosen based on Schroeder phases [26]. Estimated frequency response functions of the output rotation speed and the output torque of the IVT system are $$\hat{w}_u = -13.712 + \frac{1.880 \times 10^7}{90.551\sqrt{\frac{p}{2}}} e^{-2\left(\frac{w_i+189.033}{90.551}\right)} \quad (33)$$

$$\hat{t}_u = -23.661 + \frac{8.998 \times 10^6}{104.761\sqrt{\frac{p}{2}}} e^{-2\left(\frac{w_i+203.450}{104.761}\right)} \quad (34)$$

respectively, where $w_i \in \Omega_p$, and the subscript i denotes the ith frequency. Based on the least squares method, one has $$\Gamma = \sum_{i=1}^{29}|w_u(k) - \hat{w}_u(w_i)|^2 + \sum_{i=1}^{29}|t_u(k) - f_u(w_i)|^2 \quad (35)$$

Figure 17A:
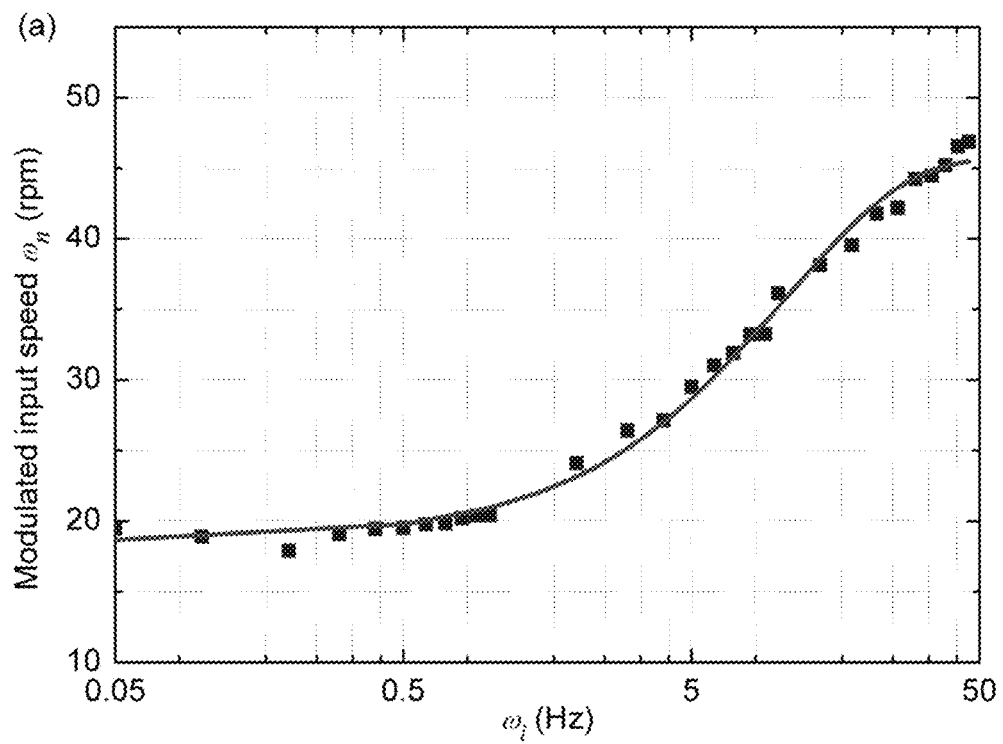
FIG. 17(A) illustrates the frequency responses (dots) for $w_i \in \Omega_p$ and estimated frequency response function (solid line) of the modulated input speed.
Figure 17B:
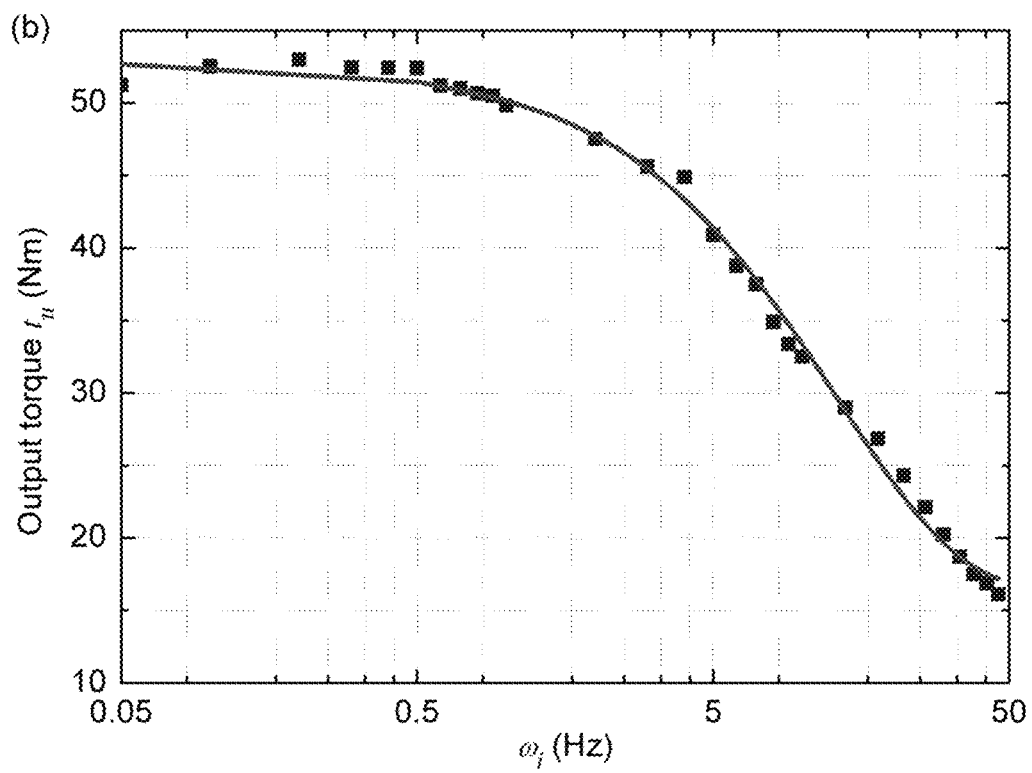
FIG. 17(B) illustrates the frequency responses (dots) for $w_i \in \Omega_p$ and estimated frequency response function (solid line) of the output torque of the IVT system.

System parameters $J_a$, $J_b$, and $J_c$ of the IVT can be obtained by minimizing Eq. (35), as shown in Table 2. Results of frequency response functions of the IVT system are based on multiple harmonics of the fundamental frequency of the IVT system, as shown in FIG. 17.

TABLE 2

System parameters of the IVT

| Parameter | Value |
|---|---|
| Effective moment of inertia of the kinetic energy $J_a$ (kg m$^2$) | 0.0346 |
| Effective mass of the kinetic energy $J_b$ (kg) | 2.9 |
| Effective mass of the kinetic energy $J_c$ (kg) | 36 |

Experiment 1

Figure 5:
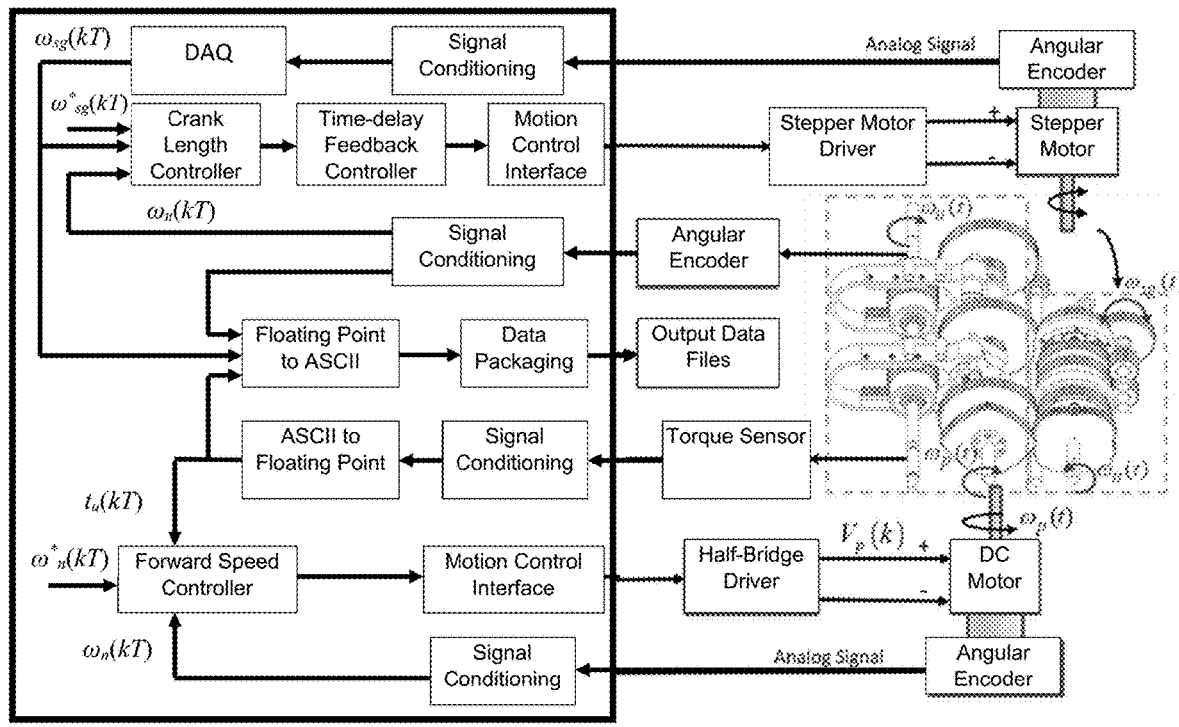
FIG. 5 is a schematic of the block diagram of the proposed control strategy for the IVT system.

The complete implementation of the proposed control strategy for the IVT system was performed using LABVIEW. National Instruments devices are used to build the controllers for the IVT system. A data acquisition (DAQ) unit was used to sample signals from three angular encoders that were installed on the input shaft, the secondary shaft, and the output shaft of the IVT, and transfers these signals to a computer. A schematic diagram is shown to explain in detail the overall operation of the control system for the IVT system, as shown in FIG. 5. Working regions of the armature voltage V, of the DC motor and the output torque $t_u$ of the brake are $V_p \in [2V, 12V]$ and $t_u \in [1.5$ Nm,9 Nm], respectively. An amplifier is needed for the crank length controller to convert a weak signal from the interface to 24 V that can drive the stepper motor for the crank length controller. The proposed control strategy for controlling the modulated input speed $w_n$ of the input-control module and the crank length $\ell_{cr}$ of the IVT system were implemented in the IVT system according to the following procedure:

Step 1: The implementation used the same control strategy for the forward speed controller and the crank length controller described in "Crank length Controller." The desired output speed for control tests was set to 20 rpm.

Step 2: The input speed $w_p(t)$ of the input shaft of the IVT was determined by the desired modulated input speed $w_n^*(kT)$ of the ICM, and was converted to the voltage percentage of the DC motor.

Step 3: The proposed control strategy of the IVT system was discretized with a sampling time of T=5 ms. The time interval for each control loop was set to 0.1 s.

Step 4: With signals from the angular encoder on the input shaft, the forward speed controller built in the computer generated the control signal for the modulated input speed $w_n(t)$ of the ICM, and the control signal was transferred to the DC motor by the time-delay feedback controller.

Step 5: The DAQ generated a signal sequence with signals of the output speed $w_u(kT)$ from the angular encoder on the output shaft, and outputs it to the crank length controller. The expected input-to-output speed ratio was changed to the next value, and the rotational angle for the stepper motor to reach the expected control angle was calculated by Eq. (20). The stepper motor was controlled by the crank length controller through the motion control interface to finish the control steps in the current control loop before the control system went to the next loop.

Experimental Results for Constant Forward Speeds

Control tests for control performances of the proposed control strategy of the IVT system was performed on the test rig in FIG. 1. Control tests for constant forward speeds were conducted to validate the average and instantaneous input-to-output speed ratio by keeping the average input-to-output speed ratio constant. In each test, the input speed of the input shaft of the IVT was a constant and the average output speed $\overline{w}_u$ was sampled over a duration of each rotation to obtain its average value. Three constant input speeds of the input shaft of the IVT were used in these tests, i.e., $w_p$=40, 60, and 80 rpm. Experimental average input-to-output speed ratios can be obtained by dividing the input speed $w_p$ by the average output speed $\overline{w}_u$.

Figure 6:
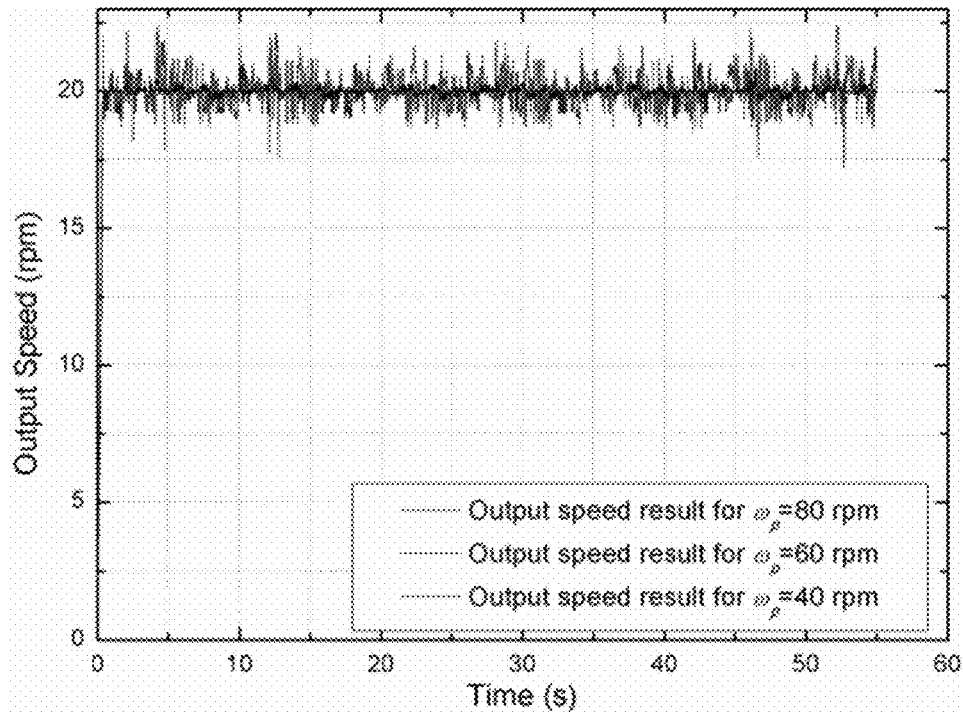
FIG. 6 illustrates the experimental results of output speeds of the IVT for constant input speeds (40, 60, and 80 rpm).

The evolution in time of the output speed $w_u$ of the IVT with two constant input speeds is shown in FIG. 6. The IVT system reached the stable desired output speed $w_u^*$ in around 0.4 s with input-to-output speed ratios via the proposed control strategy. For the time exceeding 0.4 s, the proposed crank length controller kept the input-to-output speed ratio constant, which means that the crank length $\ell_{cr}$ was a constant and the stepper motor did not operate during this period. In the time period from 0 to 0.4 s, the crank length controller changed the average input-to-output speed ratio to the expected value, and changed the rotational angle of the stepper motor to achieve the expected control angle. The error between the average output speed $\overline{w}_u$ of the IVT prototype and the desired output speed $w_u^*$ is within 1.68%.

Figure 7:
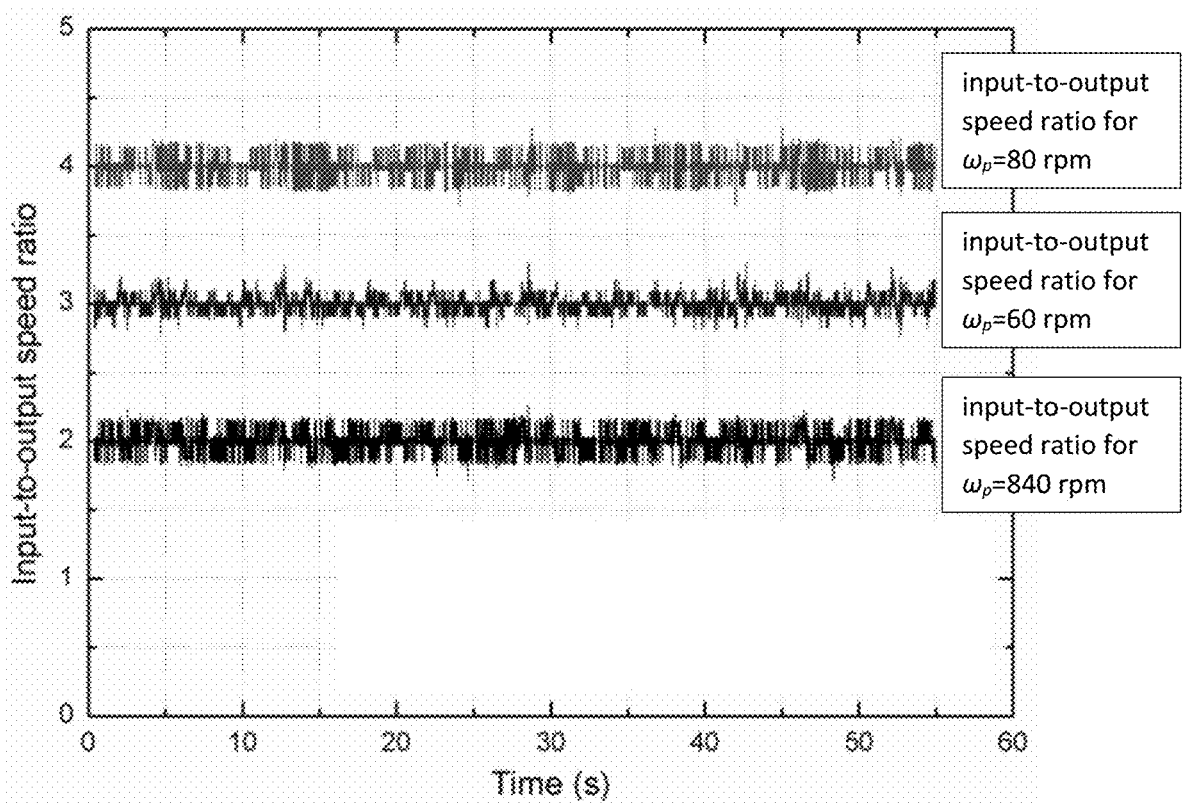
FIG. 7 illustrates the experimental results of input-to-output speed ratios of the IVT for constant input speeds (40, 60, and 80 rpm).

Responses of input-to-output speed ratios of the IVT for two constant input speeds are shown in FIG. 7. This figure illustrates that the IVT is being stabilized around input-to-output speed ratios generated by the proposed crank length controller and input-to-output speed ratios change around desired values with fluctuation. The error between the average input-to-output speed ratio of the IVT prototype and the desired value is within 1.68%. This behavior of the input-to-output speed ratio is quite normal due to many disturbances that the IVT experiments in a real condition, such as vibration and impacts of gear systems, lubrication, misalignments, and friction between gear tooth surfaces.

Figure 8:
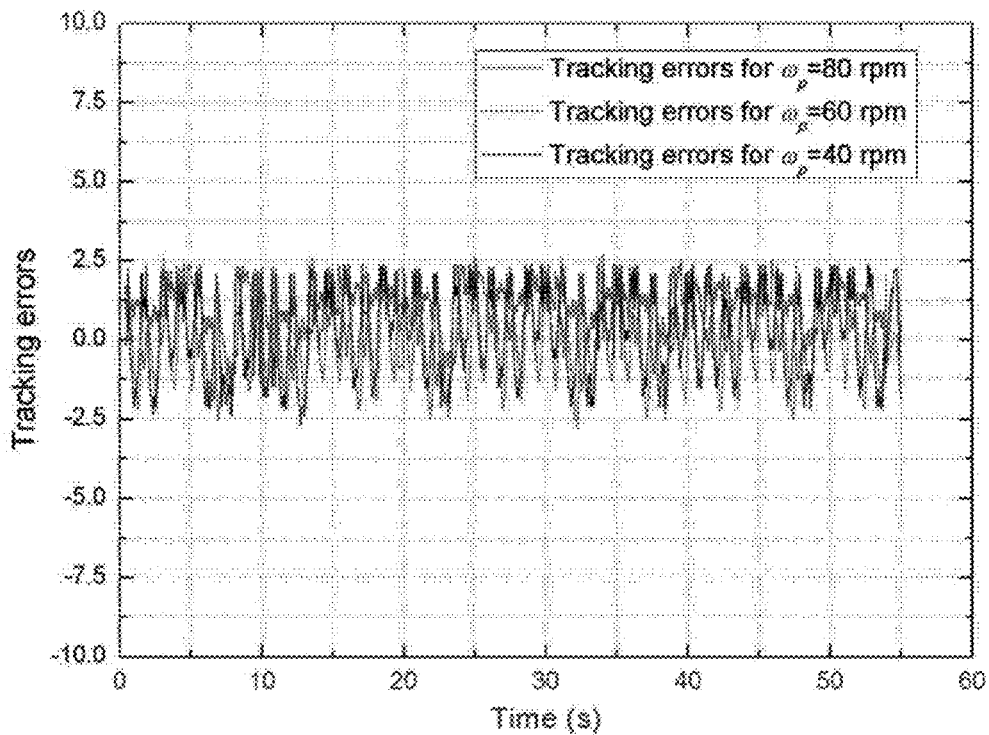
FIG. 8 illustrates the tracking errors of the forward speed controller for constant input speeds (40, 60, and 80 rpm).

FIG. 8 shows responses of tracking errors $e_p$ imposed by the forward speed controller for the modulated input speed $w_n$ of the input-control module of the IVT system. Tracking errors of the forward speed controller are within the range of ±2.52% for constant input speeds, i.e., 40, 60, and 80 rpm. By this illustration, an excellent tracking response for the modulated input speed $w_n$ of the input-control module developed by the forward speed controller can be verified.

Experimental Results for Variable Forward Speeds

Figure 9:
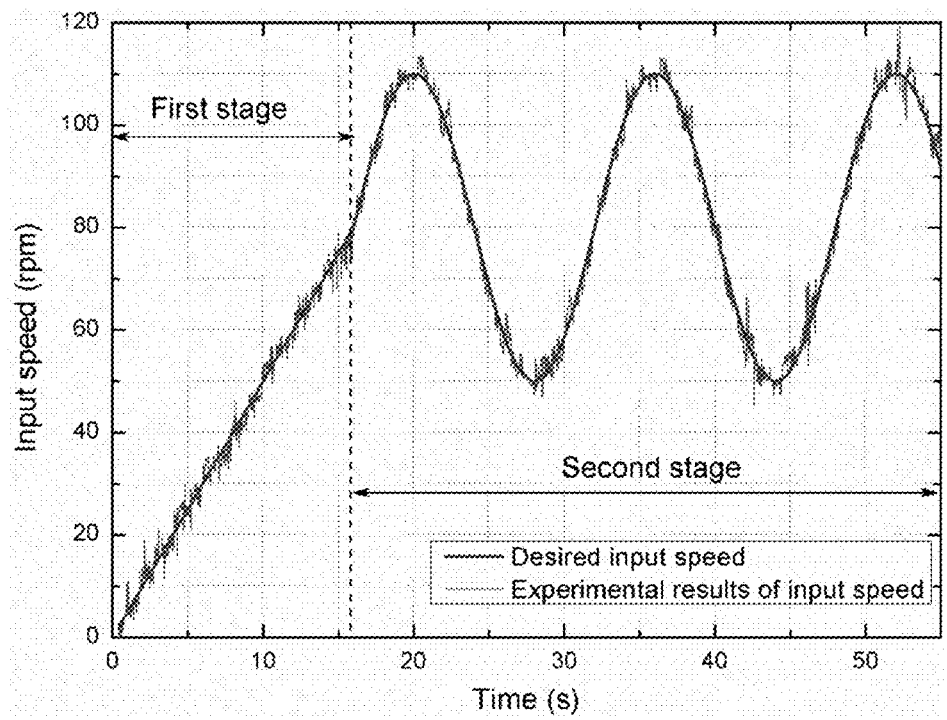
FIG. 9 illustrates the variable forward speed profile of the IVT system.

Similar to the presented experimental results for the constant forward speeds, control performance of the proposed control strategy was also evaluated in a control test using a variable input speed of the IVT system. The control test for variable forward speeds was conducted to validate the average input-to-output speed ratio by running the stepper motor to keep the output speed constant, which also was 20 rpm, with the forward speed. A variable forward speed profile is shown in FIG. 9. The variable forward speed profile involved two stages, which are 0~16 s and 16~55 s, during the control test. In the first stage, the variable forward speed increased from 0 rpm to 80 rpm based on linear increments. In the second stage, the variable forward speed varied from 50 rpm to 110 rpm based on a sine function. FIG. 9 also exhibits the tracking performance of the forward speed controller for the variable forward speed. Errors between experimental results of forward speeds of the IVT prototype and the desired forward speed are within 1.68% and 2.34% in the first and second stages, respectively. The average output speed in each stage is almost the desired value; the variation of the average output speed with respect to the desired value is less than 1.74% in the first stage, and that of the average output speed in the second stage is 2.47%.

Figure 10A:
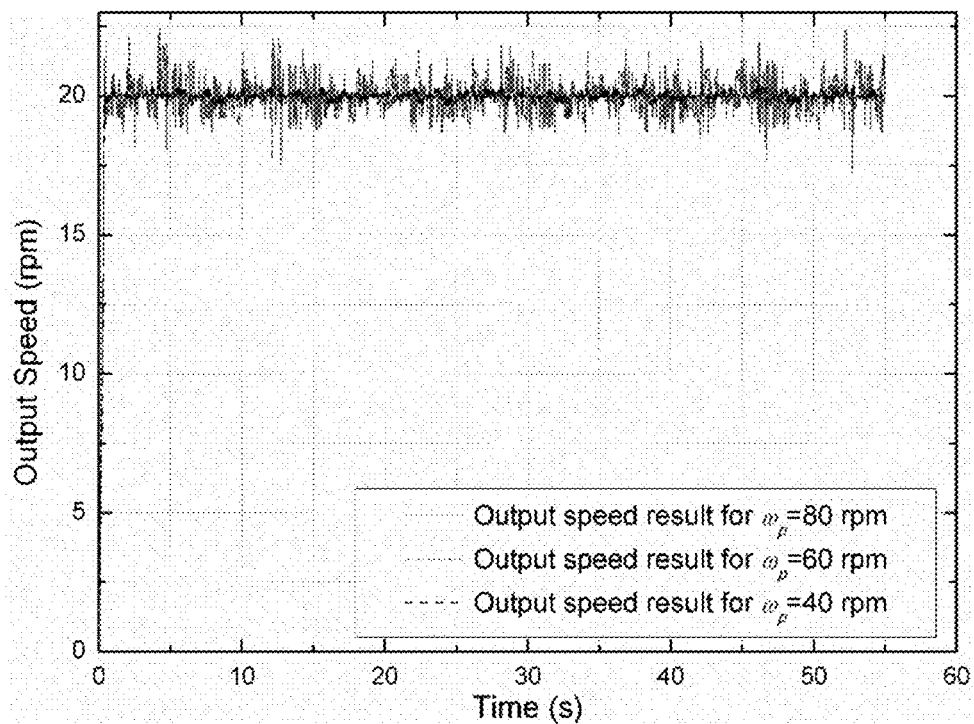
FIG. 10(A) illustrates the experimental and simulation results of output speeds of the IVT for variable input speed with time-delay.
Figure 10B:
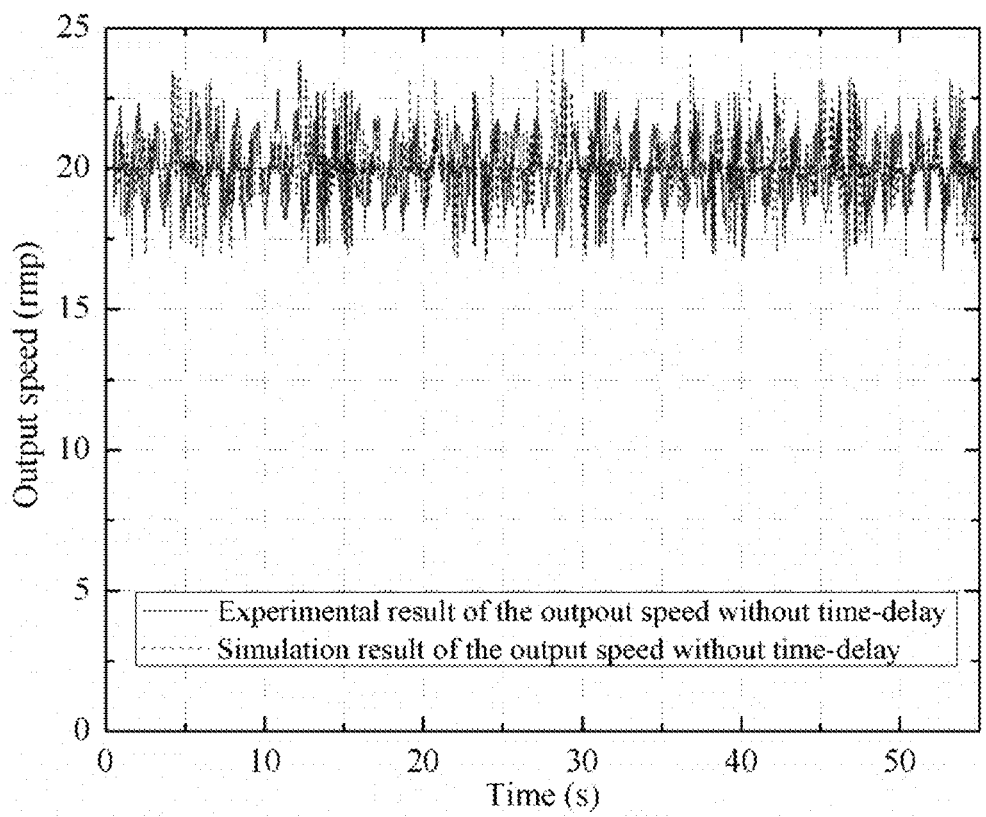
FIG. 10(B) illustrates the experimental and simulation results of output speeds of the IVT for variable input speed without time-delay.

Despite forward speed variations, the proposed control strategy effectively ensures a stable output speed $w_n$ of the IVT. FIG. 10 shows experimental and simulation results of the output speed of the IVT system. The average error between the experimental result of the output speed with time-delay and the desired output speed is 2.73%, as shown in FIG. 10(a). The average error between the experimental result of the output speed without time-delay and the desired output speed is 5.32%, as shown in FIG. 10(b). The proposed time-delay feedback control can effectively reduce speed fluctuations of the output speed of the IVT system. In order to further verify the accuracy of experimental results, simulation results of the proposed control strategy of the IVT system are provided here. The average error between the simulation result of the output speed with time-delay and the desired output speed is 0.94%. The deviation between average errors of experimental and simulation results of the output speed with time-delay is 1.79%. The average error between the simulation result of the output speed without time-delay and the desired output speed is 8.91%. Due to the damping effect of the IVT system, the average error of the experimental result of the output speed is smaller than that of the simulation result. The deviation between average errors of experimental and simulation results of the output speed without time-delay is −3.59%. High control performance of the output speed of the IVT can be verified, where small deviations between the corresponding average errors of experimental and simulation results of the output speed with and without time-delay are achieved.

Figure 11A:
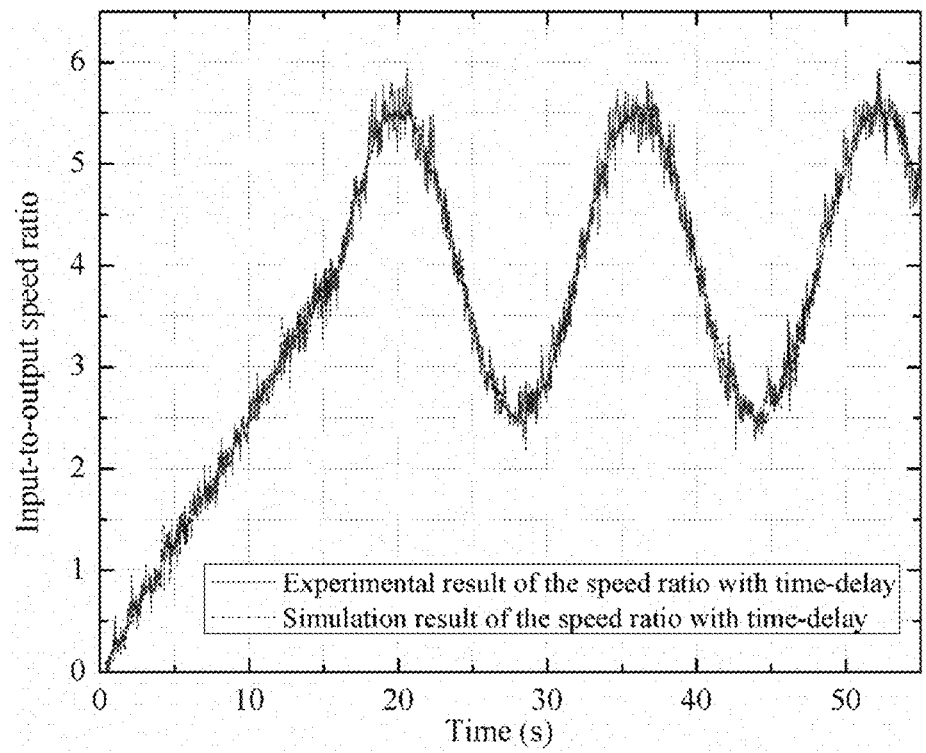
FIG. 11(A) illustrates experimental and simulation results of input-to-output speed ratios of the IVT for variable input speeds with time-delay.
Figure 11B:
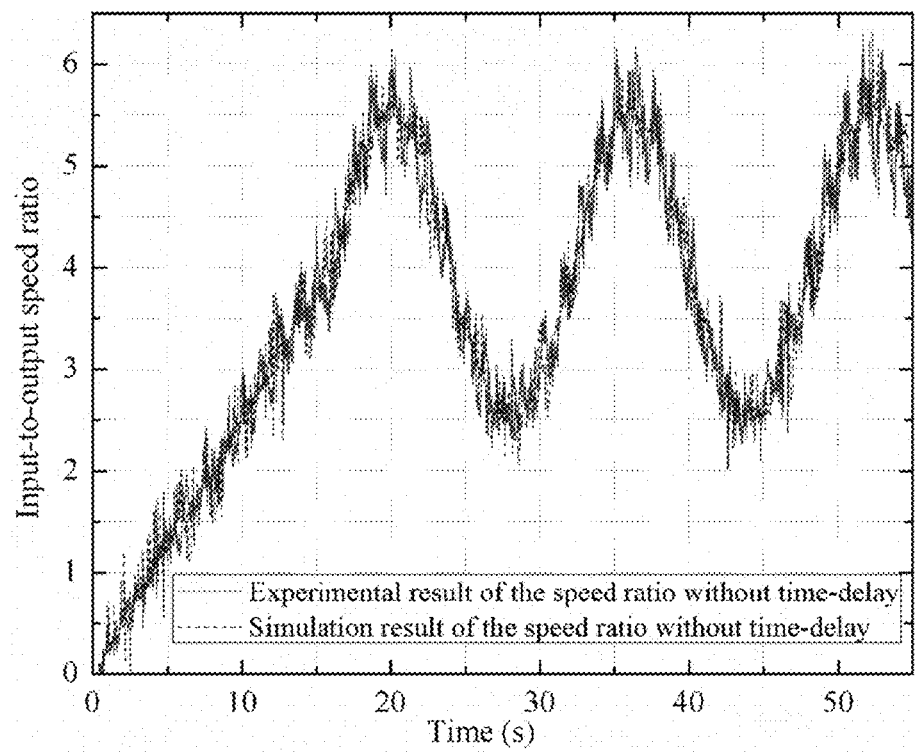
FIG. 11(B) illustrates experimental and simulation results of input-to-output speed ratios of the IVT for variable input speeds without time-delay.

The variation of the average input-to-output speed ratio in the first stage is larger than that in the second stage, because the variation of the average output speed is smaller for a larger change of the input speed. Since the input speed jumps from one wave to another in the second stage, sudden changes of the input-to-output speed ratio occur at each peak and the input-to-output speed ratio is adjusted back to the desired value in one or two control loops with the proposed control strategy. Experimental and simulation results of the input-to-output speed ratio of the IVT system are shown in FIG. 11. The average error between experimental result of the input-to-output speed ratio with time-delay and the desired value is 2.24%, as shown in FIG. 11(a). The input-to-output speed ratio can be kept to the desired value with a varied input speed. The average error between experimental results of the input-to-output speed ratio without time-delay and the desired value is 9.46%, as shown in FIG. 11(b). Fluctuations of the input-to-output speed ratio can be reduced by 7.22% with the proposed time-delay feedback control. The deviation between average errors of experimental and simulation results of the input-to-output speed ratio with time-delay is 2.81%. The deviation between average errors of experimental and simulation results of the output speed without time-delay is −3.74%. Comparison results of the corresponding experimental and simulation results with and without time-delay show experimental results can achieve a good accuracy for varied input speed.

Conclusion

An accurate and stable control design that involves input-to-output speed ratio control design, time-delay feedback control design, and system identification has been developed for high performance nonlinear control of the IVT system. Two model-based controllers of the input-to-output speed ratio control were developed based on a nonlinear dynamic model of the IVT system, which is derived using Lagrange equation. Advantageously, the two model-based controllers provide an accurate and complete model-based approach that can establish a tracking error model for desired control values in varying operating conditions with arbitrary input loads and parameter uncertainty. Specifically, the proposed control strategy with the tracking error model exhibits good control performance of the input-to-output speed ratio of the IVT system with variable forward speeds. The time-delay feedback controller is tailored to deal with reducing the fluctuation effect of the output speed of the IVT system that arises for the range of relevant operating conditions, e.g., variable input speeds. The proposed control strategy can be directly used to address commercialization and product variations of IVTs. The experimental results prove that the proposed control strategy can adjust and stabilize the input-to-output speed ratio of the IVT system for desired output rotation speeds.

Experiment 2

Figure 12:
FIG. 12 illustrates the tide measurement location at Chesapeake Bay (36° 57.531' N, 76° 00.924' W).
Figure 13:
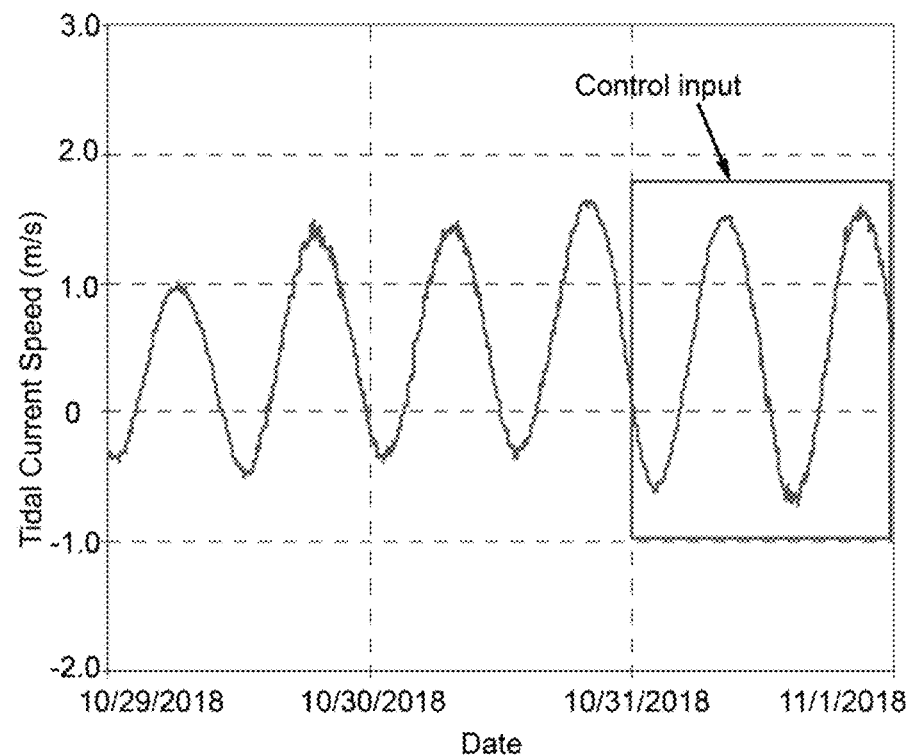
FIG. 13 illustrates the three-day tidal current speed data at the tide measurement location shown in FIG. 12.

Chesapeake Bay, which is the largest bay in the US, is approximately 315 km long and 4.2 to 56 km wide and has a surface area of nearly 11,601 km$^2$ [52]. In this experiment, tidal current speed measurement was deployed at the 20 m depth of water at the mouth of Chesapeake Bay, just east of the Bay Bridge tunnel, as shown in FIG. 12. Three-day tidal current speed data of the deployed location in Chesapeake Bay was retrieved from the National Oceanic and Atmospheric Administration [53], as shown in FIG. 13. One-day tidal current speed data is selected as the control input of this study. The positive value of the tidal current speed means tidal flows from Chesapeake Bay to Atlantic Ocean, while the negative value means the tidal flows are in the opposite direction. Magnitudes of the positive and negative directions of tidal speed ranges are approximately 0.71 m/s and 1.62 m/s, respectively. The IVT was used in a TCEC which comprised two cross-flow turbines (CFTs), an IVT, and a doubly-fed induction generator. A typical CFT is 2 m in diameter and 5 m long, with a 20 m mean depth. The TCEC can generate 35 kW at a tidal current speed of 1.5 m/s. In order to maintain high harvesting efficiency of CFTs at both low and high tidal current speeds, the TSR of CFTs should be kept at its optimal value, which for the purposes of this experiment was 2 [54].

The proposed control strategy of the IVT system was performed by using LABVIEW. A data acquisition (DAQ) unit was used to sample signals from three angular encoders that were installed on the input shaft, the control shaft, and the output shaft of the IVT, and transferred these signals to a computer. The detailed implementation of the proposed control strategy of the IVT system is shown in FIG. 5. According to the input data of one-day tidal current speed data, an acceleration control test was performed based on averaging every four data points of tidal current speeds to reduce the test time from 24 to 6 h. The proposed control strategy for controlling the modulated input speed $w_n$ of the ICM and the crank length $\ell_{cr}$ of the IVT system is implemented on the IVT system according to the following procedure:

Step 1: The implementation used the same control strategy for the forward speed controller and the crank length controller described in "Crank length Controller." The desired output speed for control tests was set to 300 rpm.

Step 2: The input speed $w_p(t)$ of the input shaft of the IVT was determined by the desired modulated input speed $w_n^*(kT)$ of the ICM, and was converted to the voltage percentage of the DC motor.

Step 3: The proposed control strategy of the IVT system was discretized with a sampling time of T=5 ms. The time interval for each control loop was set to 0.1 s.

Step 4: With signals from the angular encoder on the input shaft, the forward speed controller generates control signals for the modulated input speed $w_n(t)$ of the ICM, and the control signals were transferred to the DC motor by the time-delay feedback controller. The gains $\lambda_1$ and $\lambda_2$ in the time-delay feedback control were set as 0.015 and 0.021 mm/rad$^{-1}$, respectively.

Step 5: The DAQ generated a signal sequence with signals of the output speed $w_i(kT)$ from the angular encoder on the output shaft, and outputs it to the crank length controller. The expected input-to-output speed ratio was changed to the next value by changing the crank length $\ell_{cr}$, which is controlled by the rotational angle of the control shaft based on Eq. (20). The integral gain in the crank length controller was set as 0.0145 mm/rad$^{-1}$. The rotation angle of the control shaft was driven by the stepper motor to reach the expected rotation angle. The stepper motor was controlled by the crank length controller through the motion control interface to finish the control steps in the current control loop before the control system went to the next loop.

Experimental Control Results for Variable Tidal Speeds

Control tests on the performance of the proposed control strategy of the IVT system were conducted on the test rig in FIG. 1. The maximal crank length $\ell_{cr\,max}$ was set to 12.

Figure 14:
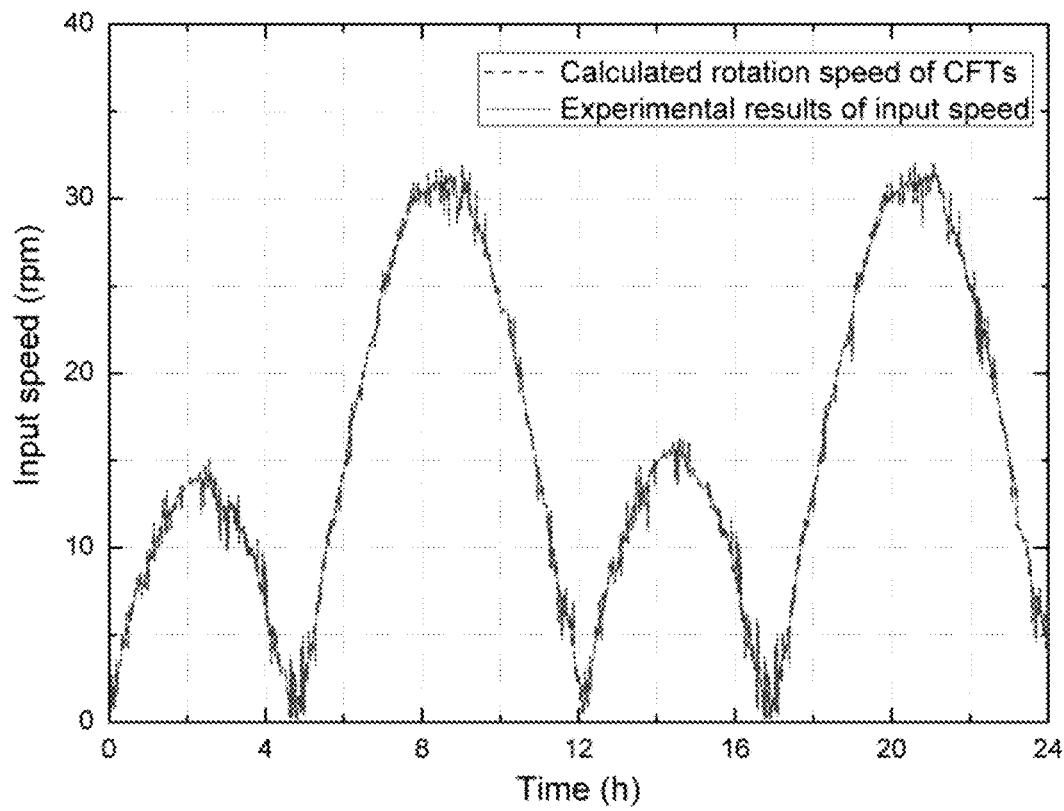
FIG. 14 illustrates the variable input speed profile of the IVT system.

Control tests for variable tidal speeds were performed to validate the control strategy with variable speed ratios. The input speed of the input shaft of the IVT and the calculated rotation speed of CFTs were obtained based on their TSR and the tidal current speed. The average output speed $\overline{w}_u$ was sampled over a duration of each rotation of the output shaft to obtain its average value. Experimental average speed ratios can be obtained by dividing the input speeds $w_p$ by the average output speeds $\overline{w}_u$. The control performance of the proposed control strategy of the IVT system was evaluated in a control test using the variable calculated rotation speed of CFTs. The control test for a variable input speed was performed to validate the control strategy by keeping the output speed constant, which is 300 rpm, with the variable rotation angle $\theta_s$ of the control shaft. The variable input speed profile that was applied in the control test is shown in FIG. 14. FIG. 14 also exhibits the tracking performance of the forward speed controller for the variable rotation speed of CFTs. Errors between experimental results of input speeds and the calculated rotation speed of CFTs were within 2.04%.

Figure 15A:
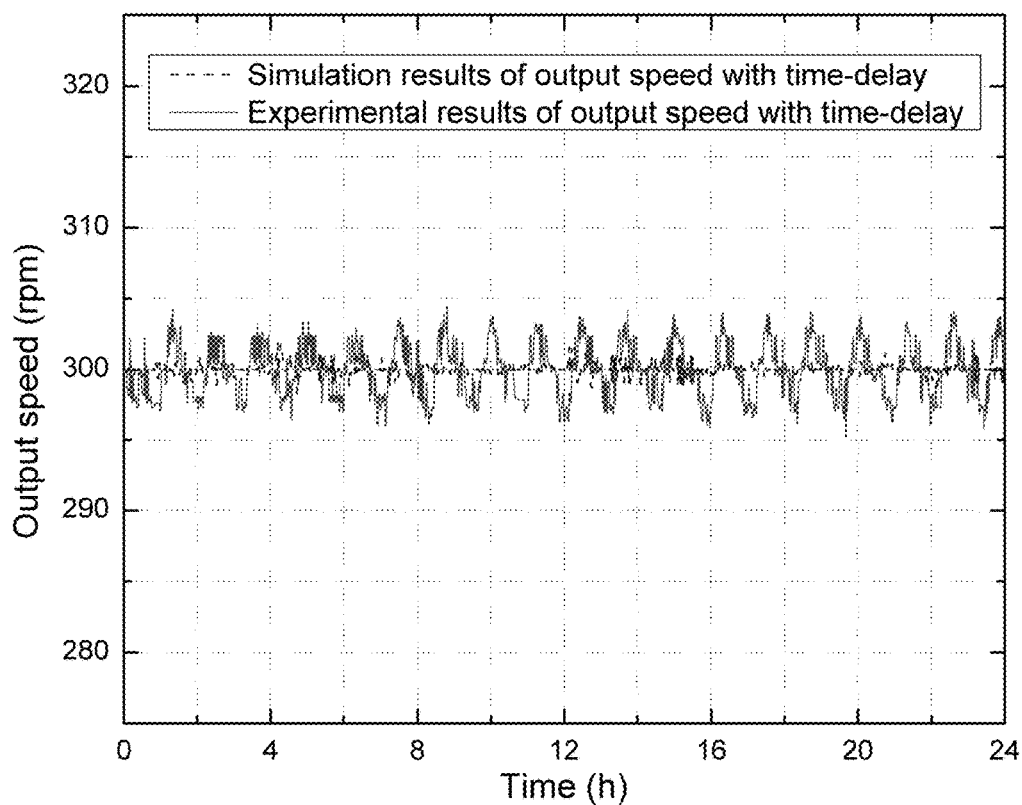
FIG. 15(A) illustrates the experimental and simulation results of the output speed of the IVT with time-delay feedback control.
Figure 15B:
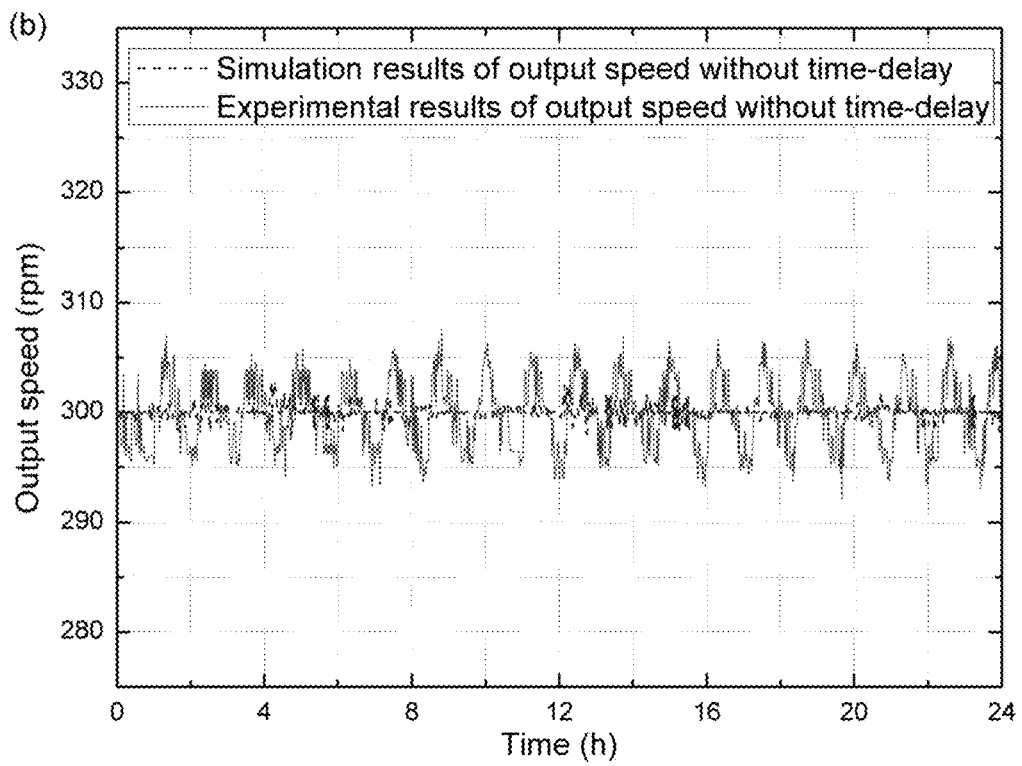
FIG. 15(B) illustrates the experimental and simulation results of the output speed of the IVT without time-delay feedback control.

The evolution in time of the output speed $w_u$ of the IVT with the variable calculated rotation speed of CFTs is shown in FIG. 15. The IVT reaches the stable desired output speed $w_u^*$ in around 0.8 s via the proposed control strategy. For the time exceeding 0.8 s, the proposed crank length controller keeps the speed ratio constant, which means that the crank length $\ell_{cr}$ is a constant and the stepper motor does not operate during this period. In the time period from 0 to 0.8 s, the crank length controller changes the crank length to its expected value and changes the rotation angle of the stepper motor to achieve the desired control angle. Errors between the average output speed $\overline{w}_u$ of the IVT and the desired output speed $w_u^*$ were within 1.61%, which can arise from backlashes in gears and gaps in components in the IVT, lubrication and misalignment issues, and friction between gear tooth surfaces.

Despite input speed variation, the proposed control strategy substantially ensures an almost constant output speed $w_n$ of the IVT system. The average error between the experimental result of the output speed without time-delay feedback control and the desired output speed was 5.04%. The proposed time-delay feedback control can effectively reduce fluctuations of the output speed of the IVT system. In order to further verify the accuracy of experimental results, simulation results of the proposed control strategy of the IVT system are also provided here. The average error between the simulation result of the output speed with time-delay feedback control and the desired output speed was 0.64%. The deviation between average errors of experimental and simulation results of the output speed with time-delay feedback control was 1.82%. The average error between the simulation result of the output speed without time-delay feedback control and the desired output speed was 4.63%. The deviation between average errors of experimental and simulation results of the output speed without time-delay feedback control was 3.87%. The high control performance of the output speed of the IVT system was validated, wherein small deviations between the corresponding average errors of experimental and simulation results of the output speed with and without time-delay feedback control were achieved.

Figure 16A:
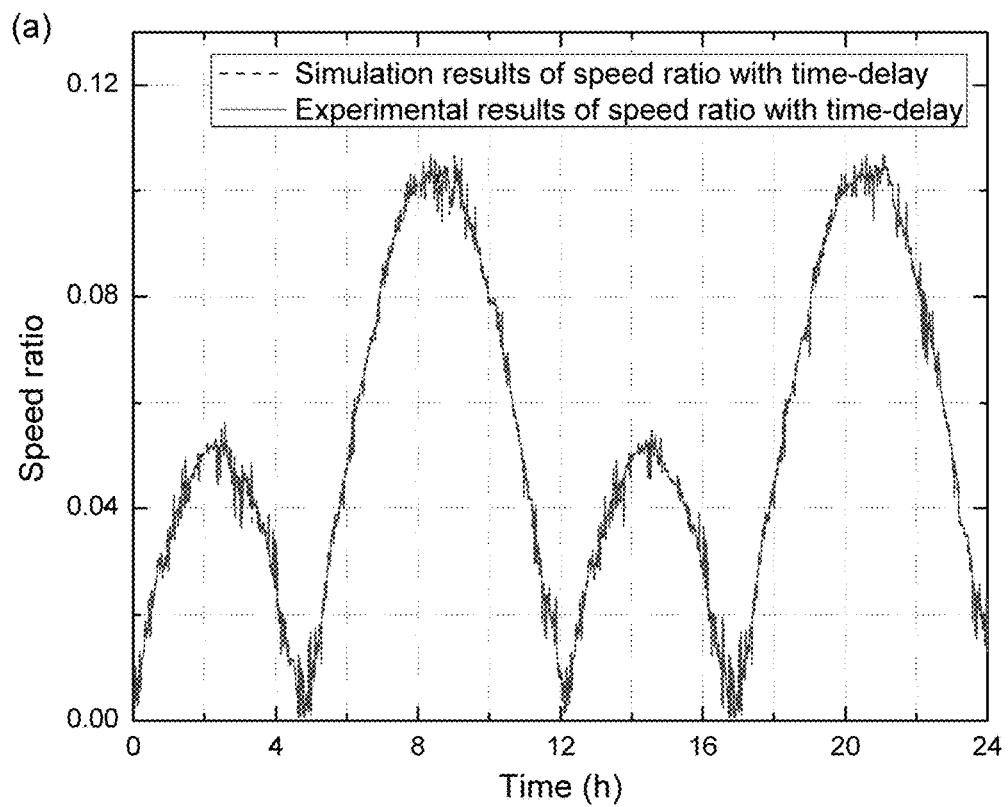
FIG. 16(A) illustrates the experimental and simulation results of the speed ratio of the IVT with time-delay feedback control.
Figure 16B:
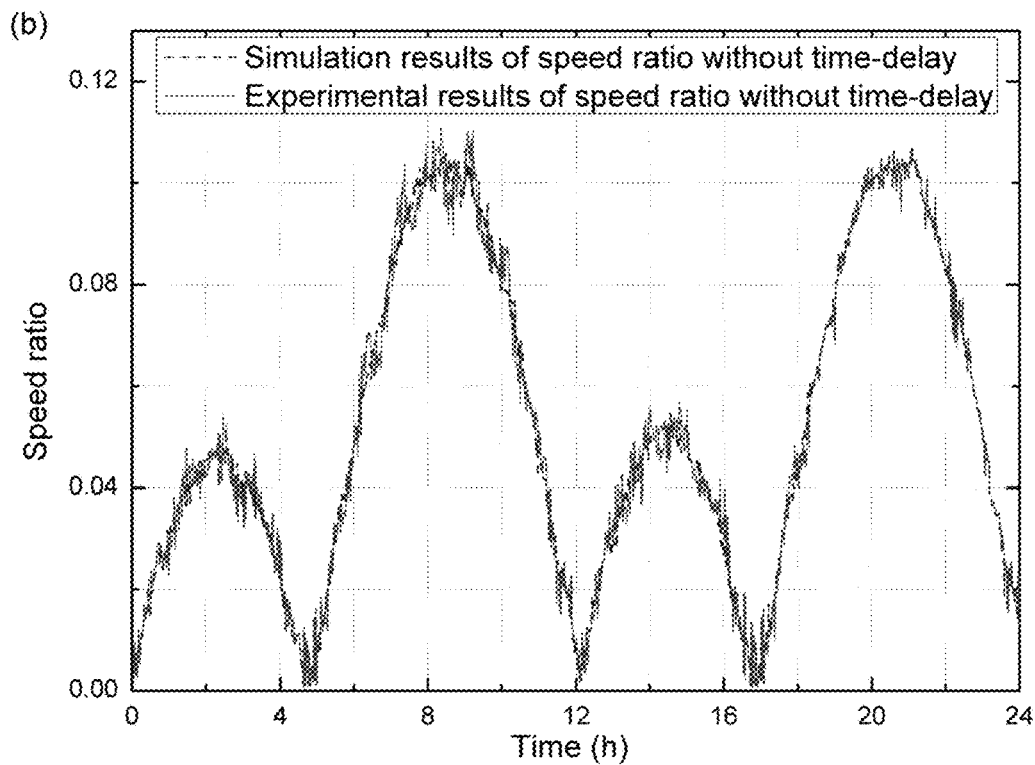
FIG. 16(B) illustrates the experimental and simulation results of the speed ratio of the IVT without time-delay feedback control.

Since the input speed jumps from one sinusoidal waveform to another, sudden changes of the speed ratio occur at each peak of the waveform and the speed ratio is adjusted back to the desired value in one or two control loops with the proposed control strategy of the IVT system. Experimental and simulation results of the speed ratio of the IVT are shown in FIG. 16. The speed ratio was kept to the desired value with the variable input speed of the IVT system. The deviation between average errors of experimental and simulation results of the speed ratio with time-delay feedback control was 2.41%, as shown in FIG. 16(A). The deviation between average errors of experimental and simulation results of the speed ratio without time-delay feedback control was 4.43%, as shown in FIG. 16(B). Fluctuations of the speed ratio can be reduced by 2.02% with the proposed time-delay feedback control. Comparison of the speed ratio of experimental and simulation results with time-delay feedback control shows that the proposed control strategy of the IVT system can achieve good control accuracy of the IVT system with the variable rotation speed of CFTs.

Conclusions

A new control strategy that combines a closed-loop control and an integral time-delay feedback control was developed for high-performance nonlinear control of the IVT system. The forward speed controller and the crank length controller were developed based on the nonlinear dynamic model of the IVT system, whose equations are derived using Lagrange's equations. The primary merit of the forward speed controller and the crank length controller lies in the fact that an accurate and complete model-based approach can establish a tracking error model for desired control values in varying operating conditions of TCECs. The proposed control strategy with the tracking error model exhibits good control performance of the speed ratio of the IVT system with a variable input speed. The time-delay feedback control can reduce fluctuations of the output speed and the speed ratio of the IVT. Experimental results show that the control strategy can adjust and stabilize the speed ratio of the IVT system for the desired output speed. The control strategy of the IVT system can restrict fluctuations of the output speed and the speed ratio within 1.61% and 2.41% for the variable rotation speed of CFTs, respectively. The proposed control strategy can be used to promote commercialization of the IVT for TCECs.

The present subject matter may be a system, a method, and/or a computer program product. The computer program product may include a computer readable storage medium (or media) having computer readable program instructions thereon for causing a processor to carry out aspects of the present subject matter.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a RAM, a ROM, an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network, or Near Field Communication. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present subject matter may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++, Javascript or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present subject matter.

Aspects of the present subject matter are described herein with reference to flowchart illustrations and/or block diagrams of methods, apparatus (systems), and computer program products according to embodiments of the subject matter. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present subject matter. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although the invention has been variously disclosed herein with reference to illustrative embodiments and features, it will be appreciated that the embodiments and features described hereinabove are not intended to limit the invention, and that other variations, modifications and other embodiments will suggest themselves to those of ordinary skill in the art, based on the disclosure herein. The invention therefore is to be broadly construed, as encompassing all such variations, modifications and alternative embodiments within the spirit and scope of the claims hereafter set forth.

REFERENCES

[1] Wang, X. F., and Zhu, W. D., 2018, "Design and Stability Analysis of an Integral Time-Delay Feedback Control Combined With an Open-Loop Control for an Infinitely Variable Transmission System," ASME Journal of Dynamic Systems, Measurement, and Control, 140(1), p. 011007.
[2] Wang, X. F., and Zhu, W. D., 2016, "Design, Modeling, and Experimental Validation of a Novel Infinitely Variable Transmission Based on Scotch Yoke Systems," ASME Journal of Mechanical Design, 138(1), p. 015001.
[3] Ross, M., 1997, "Fuel Efficiency and the Physics of Automobiles," Contemporary Physics, 38(6), pp. 381-394.
[4] Manwell, J. F., McGowan, J. G., and Rogers, A. L., 2010, Wind Energy Explained: Theory, Design and Application, John Wiley & Sons.
[5] Rupp, D., and Guzzella, L., 2010, "Adaptive Internal Model Control With Application to Fueling Control," Control Engineering Practice, 18(8), pp. 873-881.

[6] Sun, Z. X., and Hebbale, K., 2005, "Challenges and Opportunities in Automotive Transmission Control," Proceedings of the 2005 American Control Conference, Portland, pp. 3284-3289.

[7] Kulkarni, M., Shim, T., and Zhang, Y., 2007, "Shift Dynamics and Control of Dual-Clutch Transmissions," Mechanism and Machine Theory, 42(2), pp. 168-182.

[8] Srivastava, N., and Hague, I., 2009, "A Review on Belt and Chain Continuously Variable Transmissions (CVT): Dynamics and Control," Mechanism and Machine Theory, 44(1), pp. 19-41.

[9] Pner, R., Guzzella, L., and Onder, C., 2003, "Fuel-Optimal Control of CVT Powertrains," Control Engineering Practice, 11(3), pp. 329-336.

[10] References Saito, T., and Miyamoto, K., 2010, "Prediction of CVT Transmission Efficiency by Metal V-Belt and Pulley Behavior With Feedback Control," SAE International, https://doi.org/10.4271/2010-01-0855.

[11] Zhu, C., Liu, H., Tian, J., Xiao, Q., and Du, X., 2010, "Experimental Investigation on the Efficiency of the Pulley-Drive CVT," International Journal of Automotive Technology, 11(2), pp. 257-261.

[12] Savaresi, S. M., Taroni, F. L., Previdi, F., and Bittanti, S., 2004, "Control System Design on a Power-Split CVT for High-Power Agricultural Tractors," IEEE/ASME Transactions on Mechatronics, 9(3), pp. 569-579.

[13] van Berkel, K., Holman, T., Vroemen, B., and Steinbuch, M., 2012, "Optimal Control of a Mechanical Hybrid Powertrain," IEEE Transactions on Vehicular Technology, 61(2), pp. 485-497.

[14] Pesgens, M., Vroemen, B., Stouten, B., Veldpaus, F., and Steinbuch, M., 2006, "Control of a Hydraulically Actuated Continuously Variable Transmission," Vehicle System Dynamics, 44(5), pp. 387-406.

[51] Setlur, P., Wagner, J. R., Dawson, D. M., and Samuels, B., 2003, "Nonlinear Control of a Continuously Variable Transmission (CVT)," IEEE Transactions on Control Systems Technology, 11(1), pp. 101-108.

[16] Ryu, W., and Kim, H., 2008, "CVT Ratio Control With Consideration of CVT System Loss," International Journal of Automotive Technology, 9(4), pp. 459-465.

[17] Glitzenstein, K., and Hedrick, J. K., 1990, "Adaptive Control of Automotive Transmissions," Proceedings of the 1990 American Control Conference, San Diego, pp. 1849-1855.

[18] Yildiz, Y., Annaswamy, A. M., Yanakiev, D., and Kolmanovsky, I., 2011, "Spark-Ignition-Engine Idle Speed Control: An Adaptive Control Approach," IEEE Transactions on Control Systems Technology, 19(5), pp. 990-1002.

[19] Shi, G., Dong, P., Sun, H. Q., Liu, Y., Cheng, Y. J., and Xu, X. Y., 2017, "Adaptive Control of the Shifting Process in Automatic Transmissions," International Journal of Automotive Technology, 18(1), pp. 179-194.

[20] Elzaghir, W., Zhang, Y., Natarajan, N., Massey, F., and Mi, C. C., 2018, "Model Reference Adaptive Control for Hybrid Electric Vehicle With Dual Clutch Transmission Configurations," IEEE Transactions on Vehicular Technology, 67(2), pp. 991-999.

[21] Liu, F., Li, Y. X., Zhang, J. W., Huang, H. C., and Zhao, H. P., 2002, "Robust Control for Automated Clutch of AMT Vehicle," SAE Technical Paper, 2002-01-0933.

[22] Oomen, T., van der Meulen, S., Bosgra, O., Steinbuch, M., and Elfring, J., 2010, "A Robust-Control-Relevant Model Validation Approach for Continuously Variable Transmission Control," Proceedings of the 2010 American Control Conference, Baltimore, pp. 3518-3523.

[23] Oomen, T., and van der Meulen, S., 2013, "High Performance Continuously Variable Transmission Control Through Robust Control-Relevant Model Validation," ASME Journal of Dynamic Systems, Measurement, and Control, 135(6), p. 061018.

[24] Yue, D., Tian, E., and Han, Q. L., 2013, "A Delay System Method for Designing Event Triggered Controllers of Networked Control Systems," IEEE Transactions on Automatic Control, 58(2), pp. 475-481.

[25] Zhang, X. M., Han, Q. L., and Han, D. S., 2011, "Effects of Small Time-Delays on Dynamic Output Feedback Control of Offshore Steel Jacket Structures," Journal of Sound and Vibration, 330(16), pp. 3883-3900.

[26] Isermann, R., and Münchhof, M., 2011, Identification of Dynamic Systems: An Introduction with Applications, Vol. 1, Springer, Berlin Heidelberg.

[27] G. Li, W. Zhu, Design and power loss evaluation of a noncircular gear pair for an infinitely variable transmission, Mechanism and Machine Theory, 156, 2021, 104137.

[28] S. J. Sangiuliano, Turning of the tides: Assessing the international implementation of tidal current turbines, Renewable and Sustainable Energy Reviews 80 (2017) 971-989.

[29] E. Denny, The economics of tidal energy, Energy Policy 37 (5) (2009) 1914-1924.

[30] R. Everett, G. Boyle, S. Peake, J. Ramage, Energy Systems and Sustain-ability: Power for a Sustainable Future, Oxford University Press, 2012.

[31] F. O. Rourke, F. Boyle, A. Reynolds, Tidal energy update 2009, Applied Energy 87 (2) (2010) 398-409.

[32] M. Chowdhury, K. S. Rahman, V. Selvanathan, N. Nuthammachot, M. Suklueng, A. Mostafaeipour, A. Habib, M. Akhtaruzzaman, N. Amin, K. Techato, Current trends and prospects of tidal energy technology, Environment, Development and Sustainability (2020) 1-16.

[33] P. L. Fraenkel, Power from marine currents, Proceedings of the Institution of Mechanical Engineers, Part A: Journal of Power and Energy 216 (1) (2002) 1-14.

[34] N. D. Laws, B. P. Epps, Hydrokinetic energy conversion: Technology, re-search, and outlook, Renewable and Sustainable Energy Reviews 57 (2016) 1245-1259.

[35] K. A. Haas, H. M. Fritz, S. P. French, B. T. Smith, V. Neary, Assessment of energy production potential from tidal streams in the united states, Tech. rep., Georgia Tech Research Corporation (2011).

[36] M. Lewis, S. Neill, P. Robins, M. Hashemi, Resource assessment for future generations of tidal-stream energy arrays, Energy 83 (2015) 403-415.

[37] S. W. Funke, S. C. Kramer, M. D. Piggott, Design optimisation and resource assessment for tidal-stream renewable energy farms using a new continuous turbine approach, Renewable Energy 99 (2016) 1046-1061.

[38] C. Frid, E. Andonegi, J. Depestele, A. Judd, D. Rihan, S. I. Rogers, E. Kenchington, The environmental interactions of tidal and wave energy generation devices, Environmental Impact Assessment Review 32 (1) (2012) 133-139.

[39] A. M. Plagge, L. Jestings, B. P. Epps, Next-generation hydrokinetic power take-off via a novel variable-stroke hydraulic system, in: Proceedings of International Conference on Offshore Mechanics and Arctic Engineering, Vol. 45547, American Society of Mechanical Engineers, 2014, p. V09BT09A018.

[40] A. C. Mahato, S. K. Ghoshal, Various power transmission strategies in wind turbine: An overview, International Journal of Dynamics and Control 7 (3) (2019) 1149-1156.

[41] K. Touimi, M. Benbouzid, P. Tavner, Tidal stream turbines: With or with-out a gearbox?, Ocean Engineering 170 (2018) 74-88.

[42] G. Payne, A. Kiprakis, M. Ehsan, W. H. S. Rampen, J. Chick, A. Wallace, Efficiency and dynamic performance of digital Displacement™ hydraulic transmission in tidal current energy converters, Proceedings of the Institution of Mechanical Engineers, Part A: Journal of Power and Energy 221 (2) (2007) 207-218.

[43] H. W. Liu, W. Li, Y. G. Lin, S. Ma, Tidal current turbine based on hydraulic transmission system, Journal of Zhejiang University-SCIENCE A 12 (7) (2011) 511-518.

[44] V. Khare, C. Khare, S. Nema, P. Baredar, Tidal Energy Systems: Design, Optimization and Control, Elsevier, 2018.

[45] R. Kempener, F. Neumann, Tidal energy technology brief, International Renewable Energy Agency (IRENA) (2014) 1-34.

[46] A. Giallanza, M. Porretto, L. Cannizzaro, G. Marannano, Analysis of the maximization of wind turbine energy yield using a continuously variable transmission system, Renewable Energy 102 (2017) 481-486.

[47] X. X. Yin, Y.-g. Lin, W. Li, H.-W. Liu, Y.-j. Gu, Output power control for hydro-viscous transmission based continuously variable speed wind turbine, Renewable Energy 72 (2014) 395-405.

[48] H. Liu, Y. Lin, M. Shi, W. Li, H. Gu, Q. Xu, L. Tu, A novel hydraulic-mechanical hybrid transmission in tidal current turbines, Renewable Energy 81 (2015) 31-42.

[49] S. Shamshirband, D. Petkovie, A. Amini, N. B. Anuar, V. Nikolić, . Ćo-jbašić, M. L. M. Kiah, A. Gani, Support vector regression methodology for wind turbine reaction torque prediction with power-split hydrostatic continuous variable transmission, Energy 67 (2014) 623-630.

[50] K. Van Berkel, T. Hofinan, B. Vroemen, M. Steinbuch, Optimal control of a mechanical hybrid powertrain, IEEE Transactions on Vehicular Technology 61 (2) (2011) 485-497.

[51] P. Qian, B. Feng, H. Liu, X. Tian, Y. Si, D. Zhang, Review on configuration and control methods of tidal current turbines, Renewable and Sustainable Energy Reviews 108 (2019) 125-139.

[52] Y. Xiong, C. R. Berger, Chesapeake bay tidal characteristics, Journal of Water Resource and Protection 2 (7) (2010) 619.

[53] K. L. Earwaker, C. E. Zervas, Assessment of the National Ocean Service's Tidal Current Program, National Oceanic and Atmospheric Administration, 1999.

[54] K. Liu, M. Yu, W. Zhu, Enhancing wind energy harvesting performance of vertical axis wind turbines with a new hybrid design: A fluid-structure interaction study, Renewable Energy 140 (2019) 912-927.

What is claimed is:

1. A method for controlling an infinitely variable transmission, the method comprising:
   configuring a crank length controller comprising electronic components to:
      determine a desired output rotation speed of the infinitely variable transmission; and
      determine a control signal for a crank length control mechanism based on the determined output rotation speed; and
   configuring a crank length control mechanism to:
      receive the control signal; and
      control the crank length of the infinitely variable transmission based on the control signal,
   wherein the crank length control mechanism is further configured to (i) determine an estimated output rotation speed of the infinitely variable transmission and (ii) determine the control signal for the crank length control mechanism based on the estimated output rotation speed.

2. The method of claim 1, wherein the crank length controller is configured to use a look-up table to determine the crank length and to determine the control signal.

3. The method of claim 1, wherein the desired output rotation speed is determined based on a desired output speed and a desired input speed of the infinitely variable transmission.

4. The method of claim 1, further comprising configuring the crank length control mechanism to change the control signal for adjusting the crank length based on an estimate of the output rotation speed of the infinitely variable transmission.

5. The method of claim 1, wherein the infinitely variable transmission comprises a pair of meshed gears, an input-control module, and a motion conversion module.

6. The method of claim 5, wherein the input-control module comprises a first and a second planetary gear set positioned on a secondary shaft, an active control gear positioned on a control shaft, and an idler control gear positioned on an idler shaft, wherein speeds of the control shaft and the idler shaft are controlled by an actuator,
   wherein the motion conversion module comprises a first and a second scotch yoke system positioned on an input shaft, a transmitting shaft, and an output shaft,
   wherein a driving gear is positioned on the input shaft and wherein a driven gear is positioned on the secondary shaft,
   wherein a combination of an input speed from the secondary shaft and speeds of the control shaft and idler shaft constitute an output from the input-control module to the motion conversion module through the first and second planetary gear sets, respectively, wherein output speeds of the first and second planetary gear sets are input speeds of the first scotch yoke system and an output speed of the second planetary gear set is directly transmitted as an input speed to the second scotch yoke system via the transmitting shaft,
   wherein a combination of input speeds of the first and second scotch yoke systems are converted to translational speeds which are subsequently converted to rotational speeds of four output gears positioned on the output shaft through four rack-pinion meshings, and
   wherein the rotational speeds of the four output gears are rectified by one-way bearings and transmitted to the output shaft as an IVT output speed.

7. The method of claim 6, wherein the gears are noncircular gears.

8. The method of claim 6, wherein the input shaft is connected to a prime mover.

9. A computer program product comprising a computer readable storage medium having program instructions embodied therewith, the program instructions executable by a computing device to cause the computing device to control an infinitely variable transmission by:
   configuring a crank length controller comprising electronic components to (i) determine a desired output rotation speed of the infinitely variable transmission; and (ii) determine a control signal for a crank length control mechanism based on the determined output rotation speed; and generating an output representative of the control signal for input into the crank length control mechanism, and wherein the crank length control mechanism receives the control signal and determines (I) an estimated output rotation speed of the infinitely variable transmission and (II) determines the control signal for the crank length control mechanism based on the estimated output rotation speed.

10. The computer program product of claim 9, wherein the crank length control mechanism receives the control signal and controls a crank length of the infinitely variable transmission.

11. The computer program product of claim 9, wherein the desired output rotation speed is determined based on a desired output speed and a desired input speed of the infinitely variable transmission.

12. The computer program product of claim 9, wherein the crank length control mechanism generates an output representative of a change to the control signal for adjusting the crank length based on an estimate of the output rotation speed of the infinitely variable transmission.

13. The computer program product of claim 9, wherein the crank length controller is configured to use a look-up table to determine the crank length and to determine the control signal.

14. The computer program product of claim 9, wherein the infinitely variable transmission comprises a pair of meshed gears, an input-control module, and a motion conversion module.

15. A computer program product comprising a computer readable storage medium having program instructions embodied therewith, the program instructions executable by a computing device to cause the computing device to control an infinitely variable transmission by:

configuring a forward speed controller comprising electronic components to determine a crank length for the infinitely variable transmission, a desired modulated input speed of an input-control module, and an output torque of an output shaft of the infinitely variable transmission, wherein the input-control module is configured to control a motion conversion module of an infinitely variable transmission; and outputting a control signal to the input-control module based on the determined crank length, the desired modulated input speed, and the output torque.

16. The computer program product of claim 15, wherein the input-control module includes an electronic motor configured to receive the control signal and to control modulation of an input rotation speed of the input-control module based on the control signal.

17. The computer program product of claim 15, wherein the program instructions executable by the computing device further cause the computing device to:

determine a desired output rotation speed of an infinitely variable transmission; and determine a control signal for a crank length control mechanism based on the determined output rotation speed; and generate an output representative of the control signal for input into the crank length control mechanism.

18. The computer program product of claim 15, wherein the infinitely variable transmission comprises a pair of meshed gears, an input-control module, and a motion conversion module.

* * * * *